(12) United States Patent  
Saito et al.

(10) Patent No.: US 8,330,318 B2  
(45) Date of Patent: Dec. 11, 2012

(54) ROTATING ELECTRICAL MACHINE AND METHOD FOR MANUFACTURING THE SAME

(75) Inventors: Yasuyuki Saito, Hitachinaka (JP); Takashi Ishigami, Hitachinaka (JP); Kenichi Nakayama, Hitachinaka (JP); Akira Toba, Naka (JP); Toru Mita, Koshu (JP)

(73) Assignee: Hitachi, Ltd., Tokyo (JP)

( * ) Notice: Subject to any disclaimer, the term of this patent is extended or adjusted under 35 U.S.C. 154(b) by 426 days.

(21) Appl. No.: 12/197,085

(22) Filed: Aug. 22, 2008

(65) Prior Publication Data

US 2009/0085421 A1 Apr. 2, 2009

(30) Foreign Application Priority Data

Sep. 19, 2007 (JP) ................................ 2007-241743

(51) Int. Cl.  
  *H02K 3/48* (2006.01)
(52) U.S. Cl. ......... 310/214; 310/215; 310/179; 310/184
(58) Field of Classification Search .......... 310/214–215, 310/179–184  
See application file for complete search history.

(56) References Cited

U.S. PATENT DOCUMENTS

| | | | | |
|---|---|---|---|---|
| 5,258,681 A * | 11/1993 | Hibino et al. ................. | 310/214 |
| 5,300,844 A * | 4/1994 | Schuler .......................... | 310/215 |
| 5,926,940 A | 7/1999 | Toh et al. | |
| 6,229,241 B1 * | 5/2001 | Ishigami et al. .............. | 310/208 |
| 6,481,089 B1 | 11/2002 | Enomoto et al. | |
| 6,590,309 B2 * | 7/2003 | Luttrell ......................... | 310/184 |
| 7,743,483 B2 | 6/2010 | Tanaka et al. | |
| 2002/0047449 A1 * | 4/2002 | Kim et al. ...................... | 310/184 |
| 2004/0124730 A1 | 7/2004 | Yamaguchi et al. | |
| 2005/0127774 A1 * | 6/2005 | Sogabe et al. ................ | 310/215 |
| 2005/0242677 A1 * | 11/2005 | Akutsu et al. ................ | 310/179 |
| 2006/0163959 A1 | 7/2006 | Ogawa et al. | |

(Continued)

FOREIGN PATENT DOCUMENTS

EP 0 602 907 A1 6/1994

(Continued)

OTHER PUBLICATIONS

Japanese Office Action dated Sep. 29, 2009 with English translation (ten (10) pages).

(Continued)

*Primary Examiner* — Quyen Leung  
*Assistant Examiner* — Leda Pham  
(74) *Attorney, Agent, or Firm* — Crowell & Moring LLP

(57) ABSTRACT

A rotating electrical machine includes: a stator that has a stator core and a stator coil; and a rotor disposed rotatably on an inner circumferential side of the stator core. The stator core includes a plurality of slots opening on the inner circumferential side and the slots are each formed as an open slot with a width of an inner circumferential-side opening thereof ranging along a circumferential direction set substantially equal to or greater than a width of a bottom side measured along the circumferential direction. The stator further includes a slot insulator disposed between inner wall of each of the slots at the stator core and the stator coil and a holding member constituted with a nonmagnetic material and inserted in each of the slots at the stator core so as to hold the slot insulator between two side surfaces present along the circumferential direction at the slot. The stator is formed by winding the stator coil through the plurality of slots.

9 Claims, 25 Drawing Sheets

U.S. PATENT DOCUMENTS

| | | | |
|---|---|---|---|
| 2007/0052317 A1* | 3/2007 | Tanaka et al. | 310/215 |
| 2007/0222323 A1* | 9/2007 | Neet | 310/215 |
| 2008/0093948 A1 | 4/2008 | Naganawa | |

FOREIGN PATENT DOCUMENTS

| | | |
|---|---|---|
| JP | 56-71456 A | 6/1981 |
| JP | 3-50948 U | 5/1991 |
| JP | 6-237560 A | 8/1994 |
| JP | 7-23954 U | 5/1995 |
| JP | 9-327144 A | 12/1997 |
| JP | 10-66314 A | 3/1998 |
| JP | 10-271733 A | 10/1998 |
| JP | 10-285882 A | 10/1998 |
| JP | 2003-79087 A | 3/2003 |
| JP | 2004-201446 A | 7/2004 |
| JP | 2005-51981 A | 2/2005 |
| JP | 2005-185008 A | 7/2005 |
| JP | 2006-211810 A | 8/2006 |
| JP | 2008-104293 A | 5/2008 |
| WO | WO 2006/006242 A1 | 1/2006 |

OTHER PUBLICATIONS

Japanese Office Action dated Jan. 5, 2010 with English translation (four (4) pages).

Corresponding Japanese Office Action dated Aug. 3, 2010 with English Translation (Nine (9) pages).

* cited by examiner

FIG. 13

| Slot Number (442) | Phase of Conductor at Stator Coil, Located Toward Rotor (444) | Slot Number Assigned to Slot Through Which Conductor Located on Other Side from Coil Segment Formed with Rotor Side Conductor is Inserted (446) | Phase Assumed by Bottom-Side Conductor at Field Coil (448) | Slot Number Assigned to Slot Through Which a Conductor Located on Other Side from Coil Segment Formed with Bottom-Side Conductor is Inserted (450) | Coil |
|---|---|---|---|---|---|
| 28 | V5 | 33 | W6 | 23 | W13 |
| 29 | W5 | 34 | W6 | 24 | W13 |
| 30 | W5 | 35 | U5 | 25 | U22 |
| 31 | U4 | 36 | U5 | 26 | U22 |
| 32 | U4 | 37 | V5 | 27 | V22 |
| 33 | V4 | 38 | V5 | 28 | V22 |
| 34 | V4 | 39 | W5 | 29 | W22 |
| 35 | W4 | 40 | W5 | 30 | W22 |
| 36 | W4 | 41 | U4 | 31 | U12 |
| 37 | U3 | 42 | U4 | 32 | U12 |
| 38 | U3 | 43 | V4 | 33 | V12 |
| 39 | V3 | 44 | V4 | 34 | V12 |
| 40 | V3 | 45 | W4 | 35 | W12 |
| 41 | W3 | 46 | W4 | 36 | W12 |
| 42 | W3 | 47 | U3 | 37 | U21 |
| 43 | U2 | 48 | U3 | 38 | U21 |
| 44 | U2 | 1 | V3 | 39 | V21 |
| 45 | V2 | 2 | V3 | 40 | V21 |
| 46 | V2 | 3 | W3 | 41 | W21 |
| 47 | W2 | 4 | W3 | 42 | W21 |
| 48 | W2 | 5 | U2 | 43 | U11 |
| 1 | U1 | 6 | U2 | 44 | U11 |
| 2 | U1 | 7 | V2 | 45 | V11 |
| 3 | V1 | 8 | V2 | 46 | V11 |
| 4 | V1 | 9 | W2 | 47 | W11 |
| 5 | W1 | 10 | W2 | 48 | W11 |
| 6 | W1 | 11 | U1 | 1 | U24 |
| 7 | U8 | 12 | U1 | 2 | U24 |
| 8 | U8 | 13 | V1 | 3 | V24 |
| 9 | V8 | 14 | V1 | 4 | V24 |
| 10 | V8 | 15 | W1 | 5 | W24 |
| 11 | W8 | 16 | W1 | 6 | W24 |
| 12 | W8 | 17 | U8 | 7 | U14 |
| 13 | U7 | 18 | U8 | 8 | U14 |
| 14 | U7 | 19 | V8 | 9 | V14 |
| 15 | V7 | 20 | V8 | 10 | V14 |
| 16 | V7 | 21 | W8 | 11 | W14 |
| 17 | W7 | 22 | W8 | 12 | W14 |
| 18 | W7 | 23 | U7 | 13 | U23 |
| 19 | U6 | 24 | U7 | 14 | U23 |
| 20 | U6 | 25 | V7 | 15 | V23 |
| 21 | V6 | 26 | V7 | 16 | V23 |
| 22 | V6 | 27 | W7 | 17 | W23 |
| 23 | W6 | 28 | W7 | 18 | W23 |
| 24 | W6 | 29 | U6 | 19 | U13 |
| 25 | U5 | 30 | U6 | 20 | U13 |
| 26 | U5 | 31 | V6 | 21 | V13 |
| 27 | V5 | 32 | V6 | 22 | V13 |

4161

INSERTING DIRECTION

4162

INSERTING DIRECTION

ROTATING ELECTRICAL MACHINE AND METHOD FOR MANUFACTURING THE SAME

CROSS-REFERENCE TO RELATED APPLICATIONS

The present application relates to subject matters described in a co-pending patent application Ser. No. 11/965,215 filed on Dec. 27, 2007 entitled "ROTATING MACHINERY" and a co-pending patent application Ser. No. 12/036,571 filed on Feb. 25, 2008 entitled "MANUFACTURING METHOD FOR ROTARY ELECTRIC MACHINE AND STATOR".

INCORPORATION BY REFERENCE

The disclosure of the following priority application is herein incorporated by reference:
Japanese Patent Application No. 2007-241743 filed Sep. 19, 2007

BACKGROUND OF THE INVENTION

1. Field of the Invention

The present invention relates to a rotating electrical machine such as a motor or a dynamo-electric generator and a manufacturing method that may be adopted when manufacturing the rotating electrical machine.

2. Description of Related Art

Japanese Laid Open Patent Publication No. 2006-211810 (patent reference literature 1) discloses a rotating electrical machine that includes a stator coil 6 formed by sequentially joining segments constituted with a flat wire, a cluster block (connector box) 13 located at the outer circumferential surface of a stator core 12 and a leading lead wire 10 extending from the stator coil 6 constituted with the sequentially coupled segments to the cluster block 13. The leading lead wire 10 in this rotating electrical machine is manufactured by using a round wire, separately from the stator coil 6 constituted with the sequentially coupled segments and is welded onto the front end of a lead wire leader 9 constituted with a projecting portion of the starting-end segment among the segments sequentially coupled to constitute the stator coil 6.

Such a rotating electrical machine may be an induction motor that includes a squirrel-cage rotor or a synchronous motor with a rotor equipped with a permanent magnet. Since an induction motor or a synchronous motor can also be utilized as a generator, the term "rotating electrical machine" is hereafter used to refer to either a motor or a dynamo-electric generator.

Individual coil segments (segment coils) constituting the stator coil in the rotating electrical machine disclosed in patent reference literature 1 are each inserted in a slot and the segment coils are subsequently connected via the leading lead wire 10 constituted with round wire.

Thus, the rotating electrical machine disclosed in patent reference literature 1 gives rise to concerns that the degree of coil insulation may be lowered and that the rotating electrical machine manufacturing process may be unduly difficult.

SUMMARY OF THE INVENTION

A rotating electrical machine according to a 1st aspect of the present invention includes: a stator that comprises a stator core and a stator coil; and a rotor disposed rotatably on an inner circumferential side of the stator core, wherein: the stator core comprises a plurality of slots opening on the inner circumferential side and the slots are each formed as an open slot with a width of an inner circumferential-side opening thereof ranging along a circumferential direction set substantially equal to or greater than a width of a bottom side measured along the circumferential direction; the stator further comprises a slot insulator disposed between inner wall of each of the slots at the stator core and the stator coil and a holding member constituted with a nonmagnetic material and inserted in each of the slots at the stator core so as to hold the slot insulator between two side surfaces present along the circumferential direction at the slot; and the stator is formed by winding the stator coil through the plurality of slots.

According to a 2nd aspect of the present invention, in the rotating electrical machine according to the 1st aspect, it is preferable that holding grooves are formed at the two side surfaces present along the circumferential direction at each of the slots; and the holding member is inserted at the holding grooves via the slot insulator.

According to a 3rd aspect of the present invention, in the rotating electrical machine according to the 2nd aspect, it is preferable that inner circumferential side surfaces of the holding grooves incline toward the inner circumferential side of the holding grooves.

According to a 4th aspect of the present invention, in the rotating electrical machine according to the 2nd aspect, the holding member may be formed in a substantially U-shape.

According to a 5th aspect of the present invention, in the rotating electrical machine according to the 1st aspect, it is preferable that at least one end of the holding member along an axial direction is formed in a tapered shape.

According to a 6th aspect of the present invention, in the rotating electrical machine according to the 1st aspect, it is preferable that the holding member is constituted with a non-conductive material.

According to a 7th aspect of the present invention, in the rotating electrical machine according to the 1st aspect, it is preferable that the stator coil is wound through lap winding, at least a winding portion where the stator coil is lap-wound is constituted with a continuous wire and the stator coil is wound so as to range across the inner circumferential side and an outer circumferential side of the slots on two sides of the stator core along an axial direction.

According to a 8th aspect of the present invention, in the rotating electrical machine according to the 7th aspect, the stator coil may have a substantially rectangular section.

A rotating electrical machine according to a 9th aspect of the present invention includes: a stator that comprises a stator core and a stator coil; and a rotor disposed rotatably on an inner circumferential side of the stator core, wherein: the stator core comprises a plurality of slots opening on the inner circumferential side and the slots are each formed as an open slot with a width of an inner circumferential-side opening thereof ranging along a circumferential direction set substantially equal to or greater than a width of a bottom side measured along the circumferential direction; and the stator is formed by mounting an insulator constituted with an insulator sheet at the stator coil as an integrated part thereof and winding the stator coil through the plurality of slots.

According to a 10th aspect of the present invention, in the rotating electrical machine according to the 9th aspect, it is preferable that the stator coil is constituted with a continuous wire wound so as to range across through the plurality of slots at least at one end of the stator core along an axial direction; and a side of the insulator bent as the wire is laid across the plurality of slots, assumes a greater length than a length of the slots measured along the axial direction.

According to a 11th aspect of the present invention, in the rotating electrical machine according to the 10th aspect, a length of the insulator may be greater than the length of the slots measured along the axial direction.

According to a 12th aspect of the present invention, in the rotating electrical machine according to the 9th aspect, the insulator may be constituted with a resin material molded as an integrated part of the stator coil.

According to a 13th aspect of the present invention, in the rotating electrical machine according to the 9th aspect, the insulator sheet may be bonded to the stator coil.

According to a 14th aspect of the present invention, in the rotating electrical machine according to the 9th aspect, it is preferable that the stator coil is wound through lap winding, at least a winding portion where the stator coil is lap-wound is constituted with a continuous wire and the stator coil is wound so as to range across the inner circumferential side and an outer circumferential side of the slots on two sides of the stator core along an axial direction.

According to a 15th aspect of the present invention, in the rotating electrical machine according to the 14th aspect, the stator coil may have a substantially rectangular section.

According to a 16th aspect of the present invention, a rotating electrical machine manufacturing method for manufacturing a rotating electrical machine that comprises a stator comprising a stator core with a plurality of slots each having an insertion portion on an inner circumferential side formed therein along a circumferential direction, and a stator coil wound through the slots, and a rotor with a plurality of magnetic poles formed along the circumferential direction which rotates relative to the stator, includes: a preliminary forming step in which a preliminary forming process is executed by winding a plurality of times a continuous stator coil in a spiral pattern that includes a pair of linear portions facing opposite each other; a disposing step in which a plurality of winding portions are disposed along the circumferential direction so that the linear portions at the stator coil having undergone the preliminary forming process in the preliminary forming step are positioned on an inner circumferential side and an outer circumferential side; a temporary forming step in which the linear portions set on the inner circumferential side and the outer circumferential side at the plurality of winding portions at the stator coil, disposed along the circumferential direction in the disposing step, are rotated relative to each other; an insulation step in which a slot insulator constituted with an insulator sheet is inserted at each of the plurality of slots so as to form an opening on the inner circumferential side; an insertion step in which the stator coil is inserted into each of the plurality of slots through the opening formed at the insulator, so that the linear portion set on the outer circumferential side at the stator coil having undergone the temporary forming process in the temporary forming step, is positioned on a bottom side of the plurality of slots and that the linear portion, set on the inner circumferential side is positioned toward the stator coil insertion portion; a holding step in which a holding member constituted of a nonmagnetic material is inserted along an axial direction into each of the slots so as to hold therein the slot insulator; a connecting step in which terminal portions of the stator coil having been inserted in the plurality of slots through the insertion step are electrically connected; and a mounting step in which the rotor is mounted inside the stator via a bearing so that the rotor is allowed to rotate relative to the stator.

According to a 17th aspect of the present invention, a rotating electrical machine manufacturing method for manufacturing a rotating electrical machine that comprises a stator comprising a stator core with a plurality of slots each having an insertion portion on an inner circumferential side formed therein along a circumferential direction, and a stator coil wound through the slots, and a rotor with a plurality of magnetic poles formed along the circumferential direction which rotates relative to the stator, includes: a preliminary forming step in which a preliminary forming process is executed by winding a plurality of times a continuous stator coil in a spiral pattern that includes a pair of linear portions facing opposite each other; an insulation step in which insulators are mounted at the pair of linear portions at the stator coil having undergone the preliminary forming process in the preliminary forming step; a disposing step in which a plurality of winding portions are disposed along the circumferential direction so that the linear portions at the stator coil, with the insulators mounted thereat through the insulation step, are positioned on an inner circumferential side and an outer circumferential side; a temporary forming step in which the linear portions set on the inner circumferential side and the outer circumferential side at the plurality of winding portions at the stator coil, disposed along the circumferential direction in the disposing step, are rotated relative to each other; an insertion step in which the stator coil is inserted into each of the plurality of slots, so that the linear portion, set on the outer circumferential side at the stator coil having undergone the temporary forming process in the temporary forming step, is positioned on a bottom side of the plurality of slots and that the linear portion, set on the inner circumferential side, is positioned toward the stator coil insertion portion; and a mounting step in which the rotor is mounted inside the stator via a bearing so that the rotor is allowed to rotate relative to the stator.

According to a 18th aspect of the present invention, in the rotating electrical machine manufacturing method according to the 17th aspect, resin may be molded over the linear portions of the stator coil in the insulation step.

According to a 19th aspect of the present invention, in the rotating electrical machine manufacturing method according to the 17th aspect, insulators constituted with an insulator sheet may be wound over the linear portions of the stator coil and then the insulators are fixed onto the stator coil via an adhesive during the insulation step.

BRIEF DESCRIPTION OF THE DRAWINGS

FIG. 13 illustrates the relationship between the stator slot numbers and the individual coil segments constituting the stator coil;

DESCRIPTION OF PREFERRED EMBODIMENTS

First Embodiment

The following is a description of a rotating electrical machine achieved in the first embodiment of the present invention and a manufacturing method that may be adopted when manufacturing a stator in the rotating electrical machine.

The following explanation is provided by assuming that the rotating electrical machine to be described below in reference to the first embodiment of the present invention is a rotating electrical machine used in a hybrid vehicle.

It is to be noted that the rotating electrical machine achieved in the embodiment, to be used in a hybrid vehicle, fulfills both a function as a drive motor for driving the wheels and a function of a dynamo-electric generator that generates power as the wheels rotate. The rotating electrical machine is configured so as to allow either the motor function or the generator function to be selected in correspondence to the traveling state of the vehicle.

Before describing the manufacturing method that may be adopted when manufacturing the rotating electrical machine and, in particular, the stator in the rotating electrical machine in the first embodiment of the present invention, an explanation is first given on the specific structure adopted in the rotating electrical machine in the first embodiment in reference to FIGS. 1 through 6.

Figure 1:
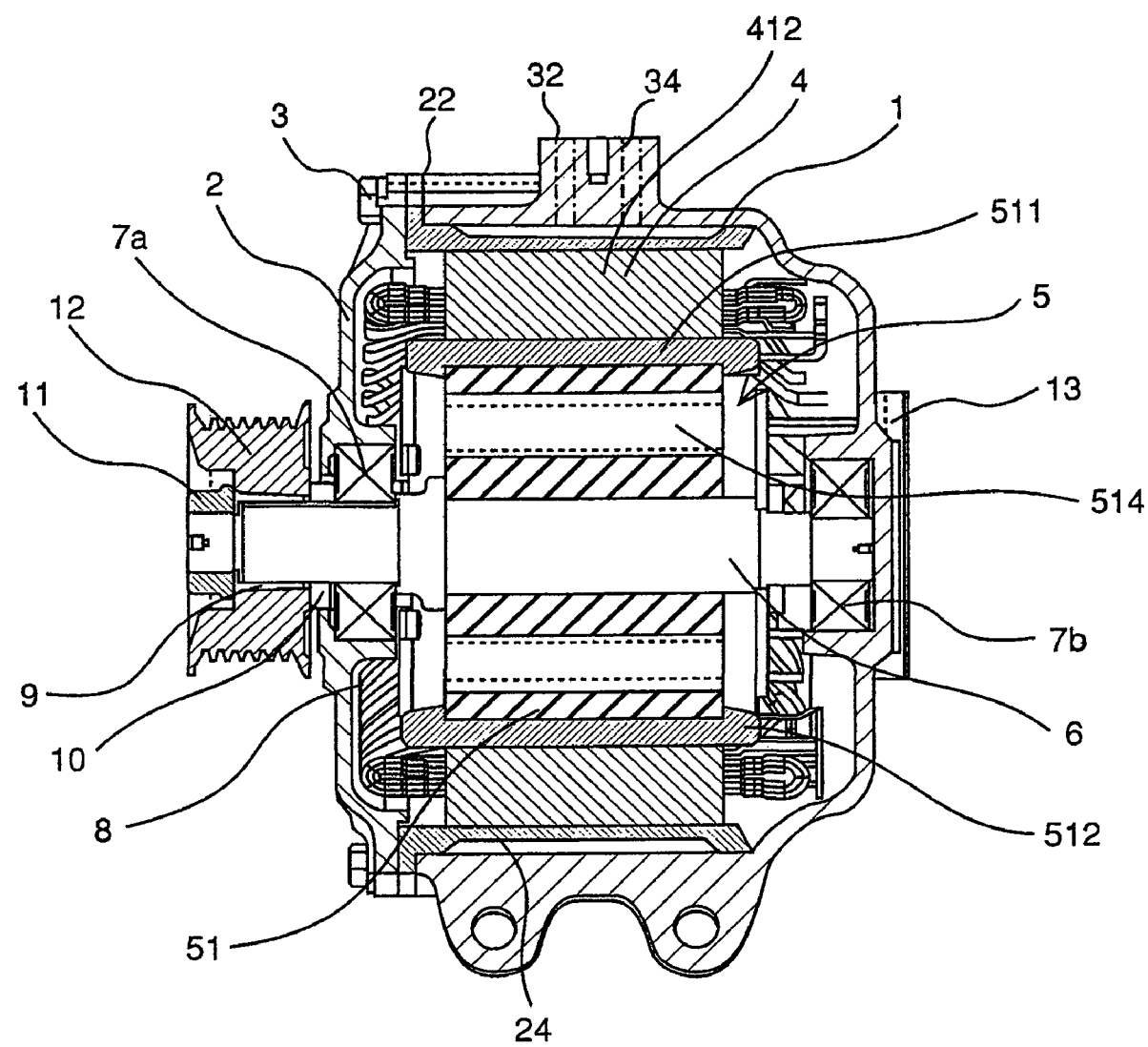
FIG. 1 is a sectional view of a rotating electrical machine achieved in a first embodiment of the present invention, taken through a side surface thereof.
Figure 2:
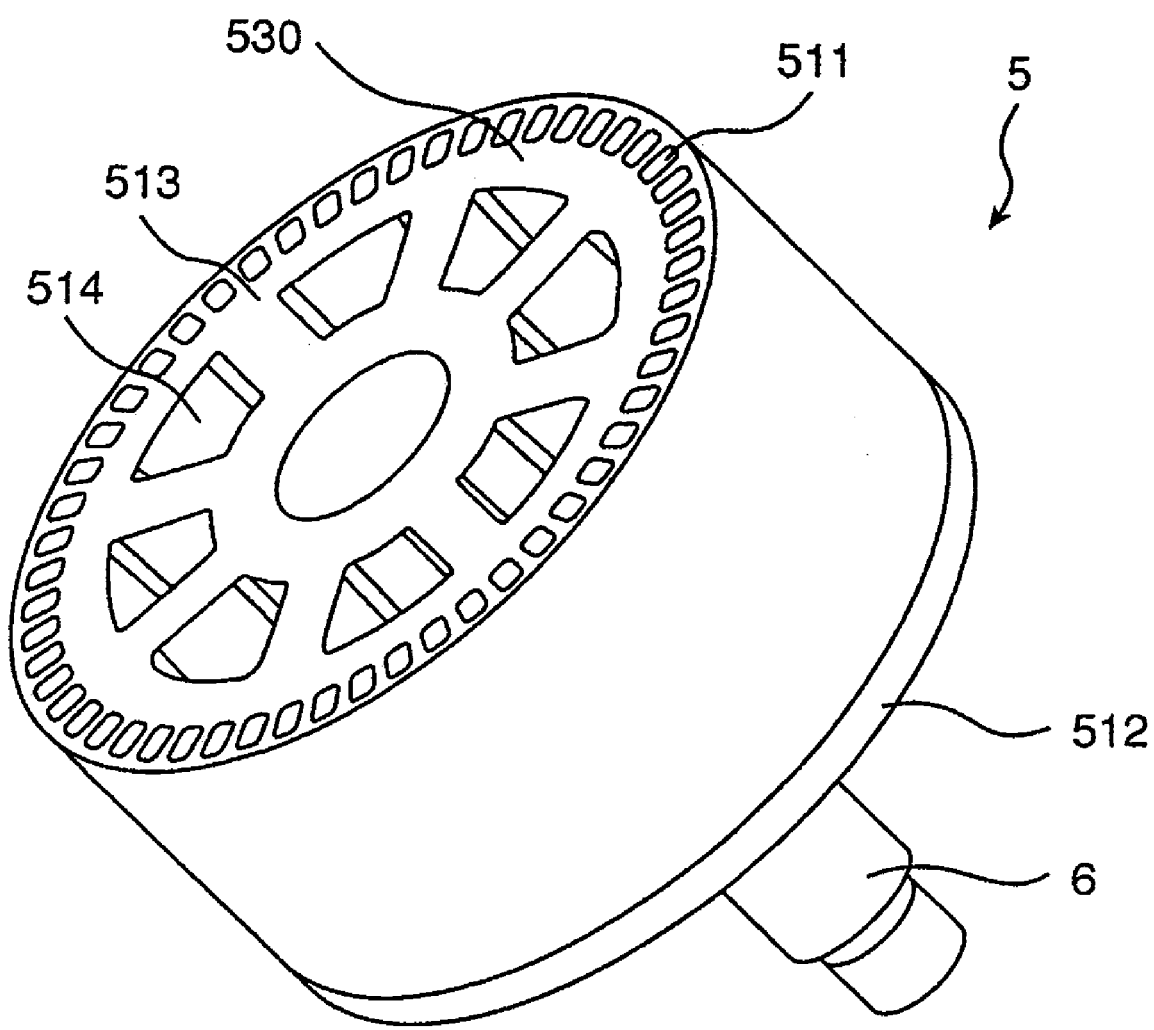
FIG. 2 is a perspective showing a rotor of the rotating electrical machine shown in FIG. 1 in a sectional view.
Figure 3:
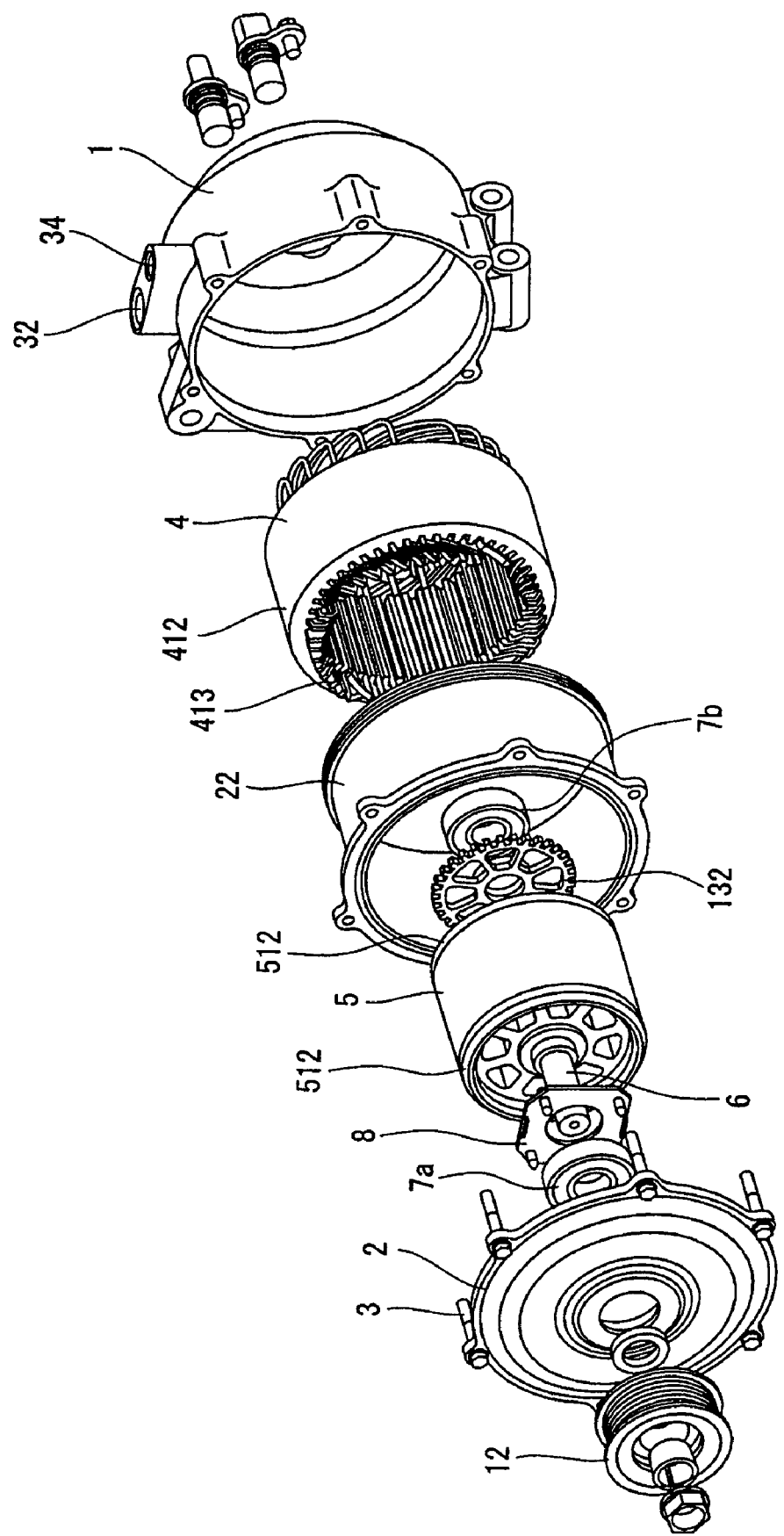
FIG. 3 is a perspective showing the individual components constituting the rotating electrical machine shown in FIG. 1.

FIGS. 1 through 6 each illustrate the rotating electrical machine for a hybrid vehicle, as achieved in the first embodiment. FIG. 1 is a sectional view of an induction rotating electrical machine taken over a side surface thereof, FIG. 2 is a perspective showing a rotor of the induction rotating electrical machine in FIG. 1 in a sectional view and FIG. 3 is a perspective presenting a development of the individual components constituting the induction rotating electrical machine shown in FIG. 1.

The induction rotating electrical machine in FIG. 1 includes a tubular housing 1 with a solid bottom, one end of which along the axial direction is formed as an open end, and a cover 2 sealing off the open end of the housing 1. The housing 1 and the cover 2 are fastened together via a plurality of (e.g., 6) bolts 3.

Inside the housing 1, a channel forming member 22, to be used to form a channel 24 through which water for cooling the rotating electrical machine flows, is disposed.

One end of the channel forming member 22 is held between the housing 1 and the cover 2 and is thus locked via the housing 1 and the cover 2. With the channel forming member 22 disposed on the inside of the housing 1, the channel 24 is formed between the housing 1 and the channel forming member 22. In other words, the channel 24 is formed between a stator 4 and the housing 1 via the channel forming member 22.

At the outer circumferential wall surface of the housing 1 on the upper side thereof, a cooling water intake port 32 and a cooling water outlet port 34 are disposed. The intake port 32 and the outlet port 34 communicate with the channel 24 formed between the housing 1 and the channel forming member 22.

Thus, cooling water taken into the channel 24 through the intake port 32 travels through the channel 24 and cools the rotating electrical machine. The cooling water having been used to cool down the rotating electrical machine is then let out through the outlet port 34.

As explained earlier, the channel forming member 22 is disposed on the inner circumferential side of the housing 1 and the stator 4 is mounted and fixed through a means such as shrink-fitting, further inward relative to the channel forming member 22.

Figure 6:
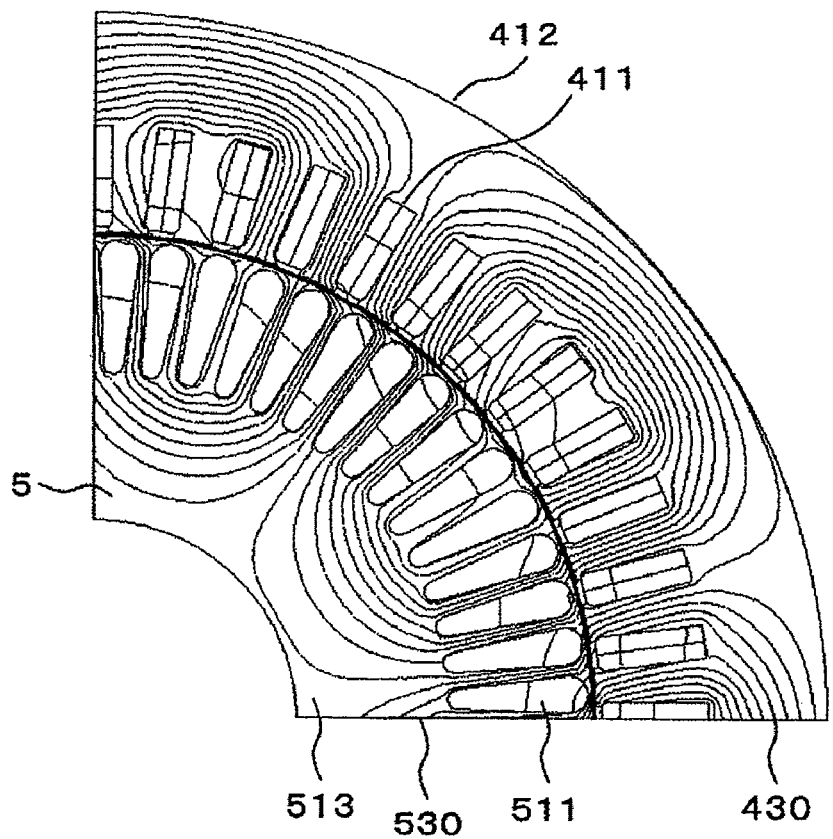
FIG. 6 illustrates how magnetic fluxes may flow when the rotation speed of the rotor is lower than the rotation speed of the rotating magnetic field generated at the stator core.
Figure 7:
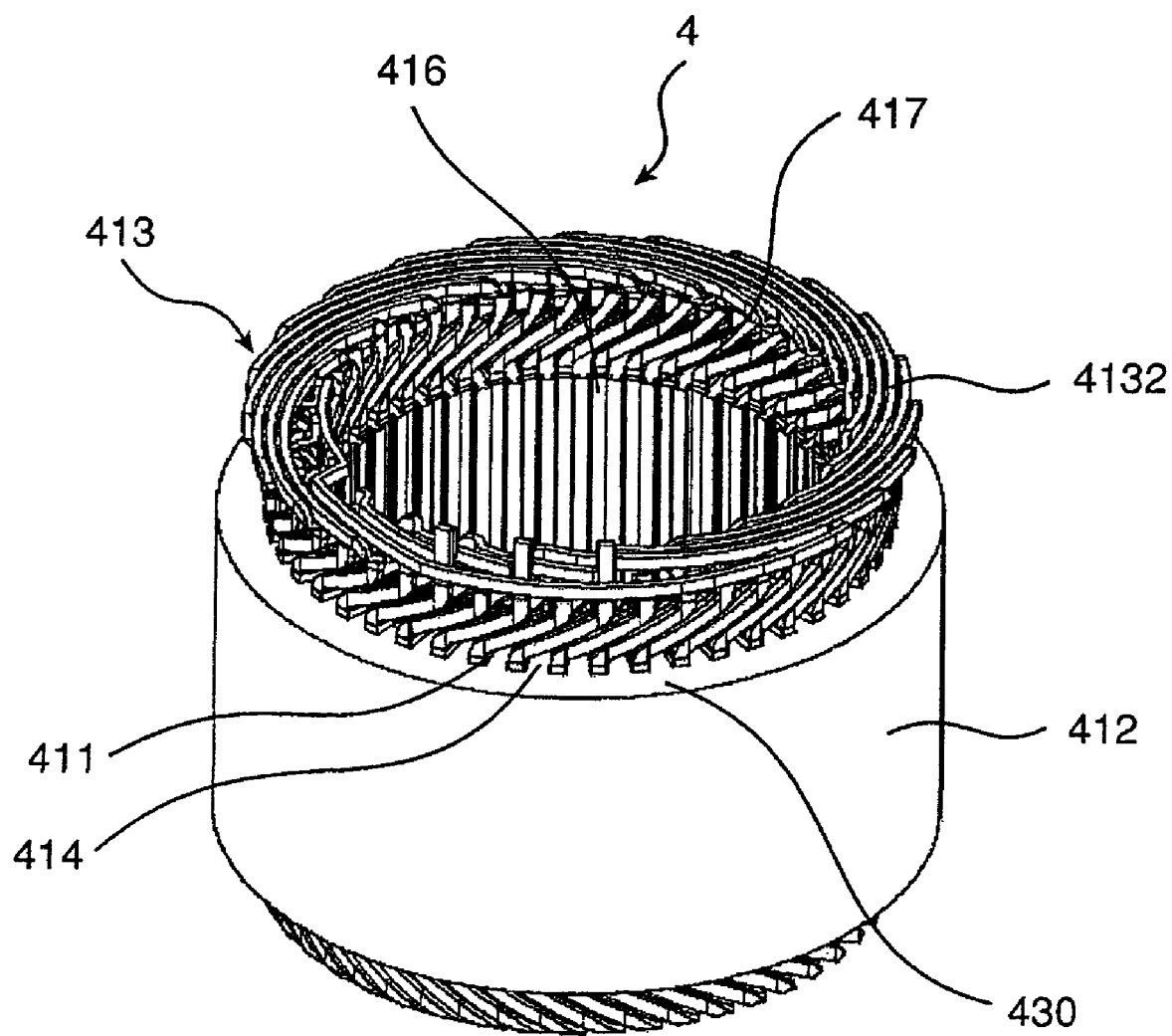
FIG. 7 is a perspective of a stator of the rotating electrical machine in FIG. 1.

The stator 4 is constituted with a stator core 412 and a stator coil 413. As shown in FIGS. 6 and 7, a plurality of slots 411 are formed along the circumferential direction over equal intervals at the stator core 412. In addition, the stator coil 413 is formed so as to assume three phases, and is wound through the individual slots 411 formed at the stator core 412.

The stator 4 assumes an 8-pole/48 slot structure. The stator coil 413 in the embodiment is connected through a star connection (X-Y-Z), and a 2Y connection having a pair of winding portions connected in parallel, is assumed at each phase.

In addition, a rotor 5 is disposed on the inner side of the stator core 412, so that it faces opposite the stator core 412 and is allowed to rotate with a slight clearance from the stator core. The rotor 5, fixed to a shaft 6, rotates as one with the shaft 6.

The shaft 6 is rotatably supported at a ball bearing 7b disposed at the housing 1 and functioning as a bearing and a ball bearing 7a disposed at the cover 2 and functioning as a bearing.

The bearing 7a located at the cover 2 is locked with a substantially quadrangular locking plate 8 shown in FIG. 3, whereas the bearing 7b located on the bottom side of the housing 1 is locked in a recess formed at the bottom of the housing 1.

One end of the shaft 6 is rotatably supported at the ball bearing 7b disposed at the housing 1 and functioning as a bearing, whereas the other end of the shaft 6 is supported at the ball bearing 7a disposed at the cover 2 and functioning as a bearing. The other end of the shaft projects out beyond the cover 2. A pulley 12 is mounted at the other end of the shaft 6 projecting out beyond the cover 2 with a nut 11 via a spacer 10 and a sleeve 9.

Thus, when the induction-type rotating electrical machine functions as a drive motor for driving the wheels, the rotation of the shaft 6 causes the pulley 12 to rotate, thereby driving a belt (not shown) running through the pulley 12 so as to output the rotational force of the shaft 6.

When the induction-type rotating electrical machine functions as a generator, which generates power as the wheels rotate, a belt (not shown) running off the engine drive shaft and through the pulley 12, is driven via the rotation of the driveshaft so as to apply rotational force from the engine driveshaft to the shaft 6. As the shaft 6 is caused to rotate via the belt (not shown) running off the engine driveshaft and through the pulley 12, the rotation of the shaft 6 causes the rotor 5 to rotate, thereby generating power.

It is to be noted that the outer circumference of the sleeve 9 and the inner circumference of the pulley 12 are both formed in a circular cone shape, the diameter of which decreases toward the housing 1. Thus, the pulley 12, firmly locked to the shaft 6 with the tightening force imparted from the nut 11 fastening the pulley 12, is allowed to rotate as one with the shaft 6.

As shown in FIG. 2, the rotor 5 includes conductor bars 511 extending along the rotational axis, disposed over its entire circumference with equal intervals. A pair of shorting rings 512 are mounted, each on one of the two sides to which the conductor bars 511 extend along the rotational axis at the rotor 5, so as to short the individual conductor bars 511 at the two ends along the rotational axis. In short, the rotor 5 is a squirrel-cage rotor with the conductor bars 511 thereof linked via the shorting rings 512. The conductor bars 511 are embedded in a rotor core 513 constituted of a magnetic material.

It is to be noted that FIG. 2, provided to clearly illustrate the relationship between the rotor core 513 and the conductor bars 511, shows the rotor 5 in a sectional view taken through a plane perpendicular to the rotational axis and does not include an illustration of the shorting rings 512 on the pulley side of the shaft 6.

The rotor core 513 of the rotor 5 is constituted with a laminated steel sheet assembly obtained by forming an electromagnetic steel sheet with a thickness of approximately 0.05~1 mm through punching or etching and layering a plurality of such electromagnetic steel sheets. As shown in FIGS. 2 and 3, substantially fan-shaped hollow portions 514 are formed with equal intervals along the circumferential direction at the stator core 513 on its inner circumferential side, so as to provide a lighter-weight rotor 5.

On the outer circumferential side of the rotor core 513, a plurality of spaces to house the individual conductor bars 511 are formed. The conductor bars 511 at the rotor core 513 are located toward the stator. The rotor core 513 includes a rotor yoke 530, which is located further inward relative to the conductor bars 511 and is used to create a magnetic circuit.

The stator 4 in the embodiment includes an eight-pole stator coil 413. By assuming an eight-pole structure at the stator coil 413 of the stator 4 as described above, the thickness of the magnetic circuit formed at the rotor yoke 530, measured along the radial direction, can be reduced compared to that in an induction-type rotating electrical machine with the stator coil 413 thereof assuming a two-pole or four-pole structure.

By assuming a structure with even more poles than eight formed at the stator coil 413 of the stator 4 in the embodiment, the thickness of the magnetic circuit formed at the rotor yoke 530, measured along the radial direction, can be further reduced. However, when there are 12 or more poles formed at the stator coil 413 of the stator 4, the output and the efficiency are bound to be compromised.

Accordingly, the appropriate number of poles formed at the stator coil 413 of the stator 4 in a vehicle-drive rotating electrical machine that must fulfill a satisfactory engine startup function is six to ten and preferably eight or ten.

The conductor bars 511 and the shorting rings 512 at the rotor 5 are constituted of aluminum and they are all formed as integrated parts of the rotor core 513 through die-casting.

It is to be noted that the shorting rings 512 disposed at the two ends of the rotor core 513 project at the two ends further outward relative to the rotor core 513 along the axial direction.

A detection rotor 132 disposed toward the bottom side of the housing 1 and fixed onto the shaft 6, is caused to rotate together with the shaft 6, as shown in FIG. 3. The detection rotor 132 is formed as a tooth gear, with a rotation sensor 13 disposed at a position facing opposite the teeth of the detection rotor 132. The rotation sensor 13 has a function of detecting the teeth of the detection rotor 132 and outputting an electrical signal to be used to detect the position of the rotor 5 or the rotation speed of the rotor 5.

Next, the operation of the induction-type rotating electrical machine achieved in the first embodiment is explained in reference to FIGS. 1 through 6.

Figure 4:
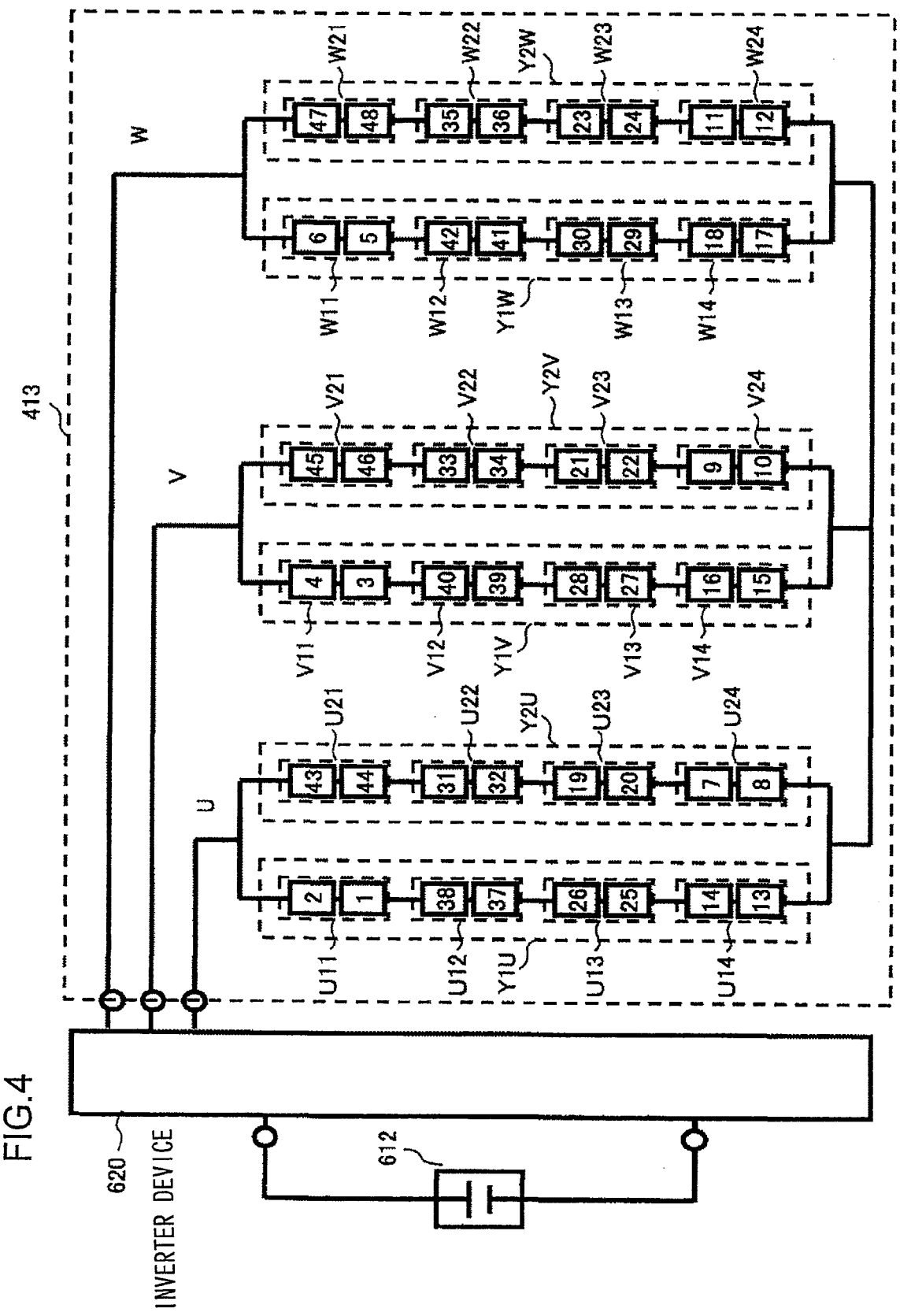
FIG. 4 is a system diagram illustrating the electrical connections in the rotating electrical machine in FIG. 1.
Figure 5:
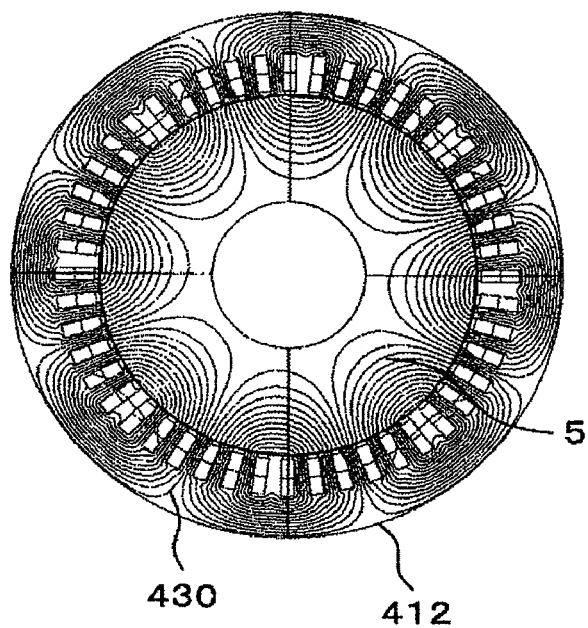
FIG. 5 illustrates a state of the rotating magnetic field generated via the stator coil.

FIGS. 1~3 have been described earlier. FIG. 4 is a system diagram illustrating the electrical connections in the rotating electrical machine in the first embodiment, FIG. 5 shows the state of a rotating magnetic field generated via the stator coil and FIG. 6 shows the magnetic fluxes generated when the rotation speed of the rotor 5 is lower than the rotation speed of the rotating magnetic field induced via the stator core 412.

First, the power-running operation of the rotating electrical machine functioning as a drive motor for driving the wheels and the engine, is described.

A high-voltage secondary battery 612 in FIG. 4, capable of generating a voltage in a range of, for instance, 100V~600V, is electrically connected with a DC terminal of an inverter device 620. The stator coil 413 is electrically connected to an AC terminal of the inverter device 620.

As DC power is supplied from the secondary battery 612 to the inverter device 620, AC power is supplied from the inverter device 620 to the three-phase stator coil 413 wound at the stator core 412.

As the AC power is supplied from the inverter device 620 to the three-phase stator coil 413 wound at the stator coil 412, a rotating magnetic field assuming a rotation speed determined based upon the frequency of the supplied AC power is induced via the stator core 412.

The state of the rotating magnetic field generated via the stator core 412 is shown in FIG. 5. FIG. 5 shows the state of the rotating magnetic field, virtually induced via the stator 4 with the stator coil 413 thereof assuming an eight-pole structure in conjunction with a rotor 5 equipped with a standard rotor core with no conductor bars 511 installed therein, so as to eliminate any influencing factors attributable to the rotor 5.

FIG. 5 shows a core back 430 present further outward relative to the slots 411 in the stator core 412 and the magnetic circuit of the rotating magnetic field is formed via the core back 430. Since a relatively large number (eight) of poles are formed at the stator coil 413 in the simulation illustrated in FIG. 5, the thickness of the magnetic circuit at the core back 430, measured along the radial direction, can be reduced. In addition, the thickness of the magnetic circuit measured along the radial direction on the rotor side, too, is reduced.

As shown in FIG. 5, as the rotating magnetic field is supplied to the stator coil 413, the rotor 5 is caused to rotate based upon the frequency of the AC power supplied to the stator coil 413.

The inverter device 620 in FIG. 4 generates an AC current needed to generate the required torque and supplies the AC current to the stator coil 413. If the rotation speed of the rotor 5 is lower than the rotation speed of the rotating magnetic field, the conductor bars 511 interlink with the rotating magnetic field induced at the stator core 412 and, as a result, an electric current flows through the conductor bars 511 in the phenomenon known as Faraday's law.

As the electric current flows through the conductor bars 511, a rotational torque is generated at the rotor 5 and the rotor 5 rotates in the phenomenon known as Fleming's left-hand rule.

It is to be noted that since the difference between the rotation speed of the rotor 5 and the rotation speed of the rotating magnetic field at the stator 4 affects the level of the torque, the slip, i.e., the speed difference, must be controlled optimally.

Accordingly, the rotational position or the rotation speed of the rotor 5 is detected based upon the output from the rotation sensor 13 and the frequency of the AC current to be supplied to the stator coil 413 at the stator 4 is controlled by regulating the switching frequency at the inverter device 620.

FIG. 6 presents the results of a simulation for a state of magnetic fluxes that may manifest when the rotation speed of the rotor 5 having installed therein the conductor bars 511 is lower than the rotation speed of the rotating magnetic field generated at the stator core 412.

The rotor 5 in the induction-type rotating electrical machine shown in FIG. 6 rotates along the counterclockwise direction. Magnetic fluxes induced via the stator coil 413 disposed through the slots 411 at the stator 4 pass through the magnetic circuit that includes the core back 430 and the rotor yoke 530 at the rotor core 513.

In addition, magnetic fluxes at the rotor core 513 of the rotor 5 are shifted toward the retarding side along the rotating direction in which the rotor 5 rotates, relative to the magnetic fluxes at the stator core 412.

Next, the operation of the rotating electrical machine functioning as a dynamo-electric generator that generates power is described.

The rotating electrical machine functions as a power generator when the rotation speed of the rotor 5 rotating together with the shaft 6 with the rotational force imparted from the engine driveshaft and input via the pulley 12 fixed to the shaft 6, is higher than the rotation speed of the rotating magnetic field induced at the stator core 412 of the stator 4.

When the rotation speed of the rotor 5 exceeds the rotation speed of the rotating magnetic field induced at the stator core 412 of the stator 4, the conductor bars 511 at the rotor 5 interlink with the rotating magnetic field and, as a result, a braking force is applied to the rotor 5. The application of the braking force to the rotor 5 induces electrical power at the stator coil 413 of the stator 4, and thus, power is generated.

Namely, when the frequency of the AC power generated at the inverter device 620 shown in FIG. 4 is lower and the rotation speed of the rotating magnetic field induced at the stator core 412 of the stator 4 is lower than the rotation speed of the rotor 5, DC power is supplied from the inverter device 620 to the secondary battery 612.

The electrical power generated at the rotating electrical machine as described above, the level of which is determined based upon the difference between the rotation speed of the rotating magnetic field induced at the stator core 412 of the stator 4 and the rotation speed of the rotor 5, can be controlled by controlling the operation of the inverter device 620.

In other words, assuming that the extent of the rotating electrical machine loss, the invalid power and the like are insignificant enough to be disregarded, the rotating electrical machine is able to function as a motor with electrical power supplied thereto from the secondary battery 612 via the inverter device 620, by allowing the rotating magnetic field induced at the stator core 412 of the stator 4 to rotate faster than the rotor 5.

When the rotating magnetic field induced at the stator core 412 of the stator 4 is made to rotate at a rotation speed matching the rotation speed of the rotor 5, on the other hand, no power is exchanged between the secondary battery 612 and the rotating electrical machine. When the rotating magnetic field induced at the stator core 412 of the stator 4 rotates slower than the rotor 5, electrical power is supplied from the rotating electrical machine to the secondary battery 612 via the inverter device 620.

However, the rotating electrical machine loss, the invalid power and the like cannot be disregarded in actual application and, in fact, power supply from the secondary battery 612 to the rotating electrical machine ceases when the rotation speed of the rotating magnetic field induced at the stator core 412 of the stator 4 is slightly lower than the rotation speed of the rotor 5.

Next, the stator 4 is described in detail in reference to FIGS. 4 and 7 through 13.

Figure 8:
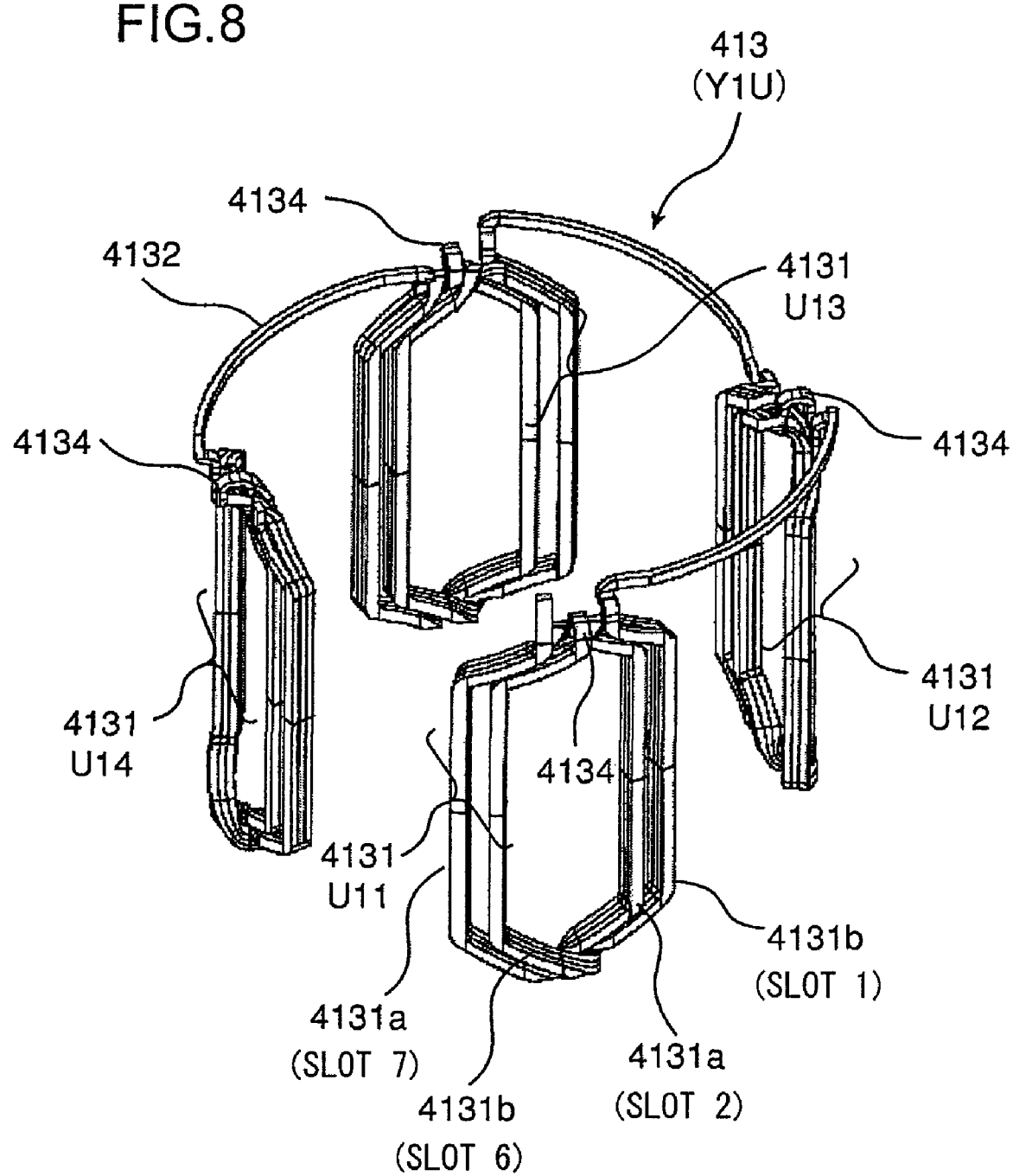
FIG. 8 is a perspective of a single continuous coil used to form the stator coil.
Figure 9:
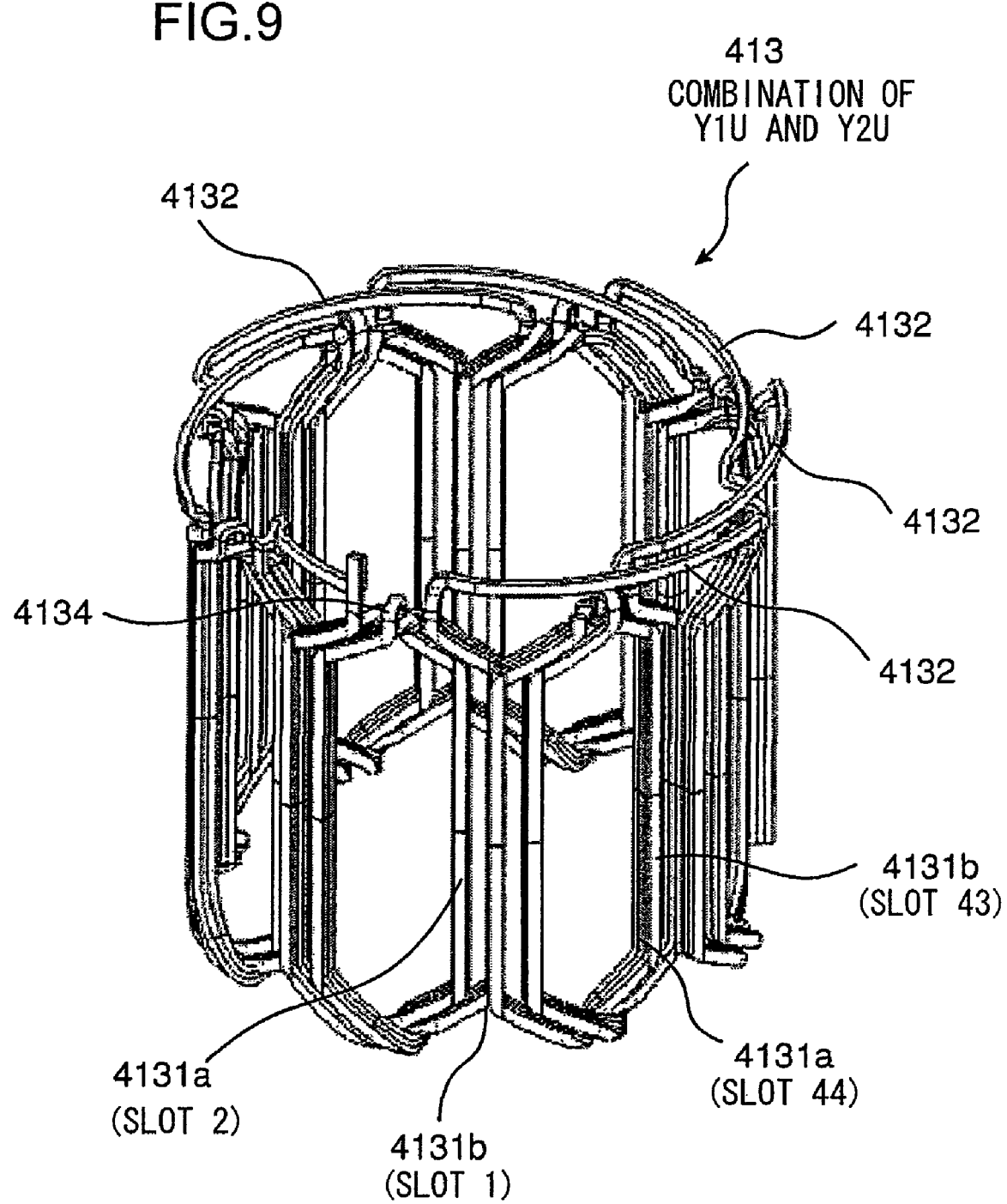
FIG. 9 is a perspective of the coil for a given phase.
Figure 10:
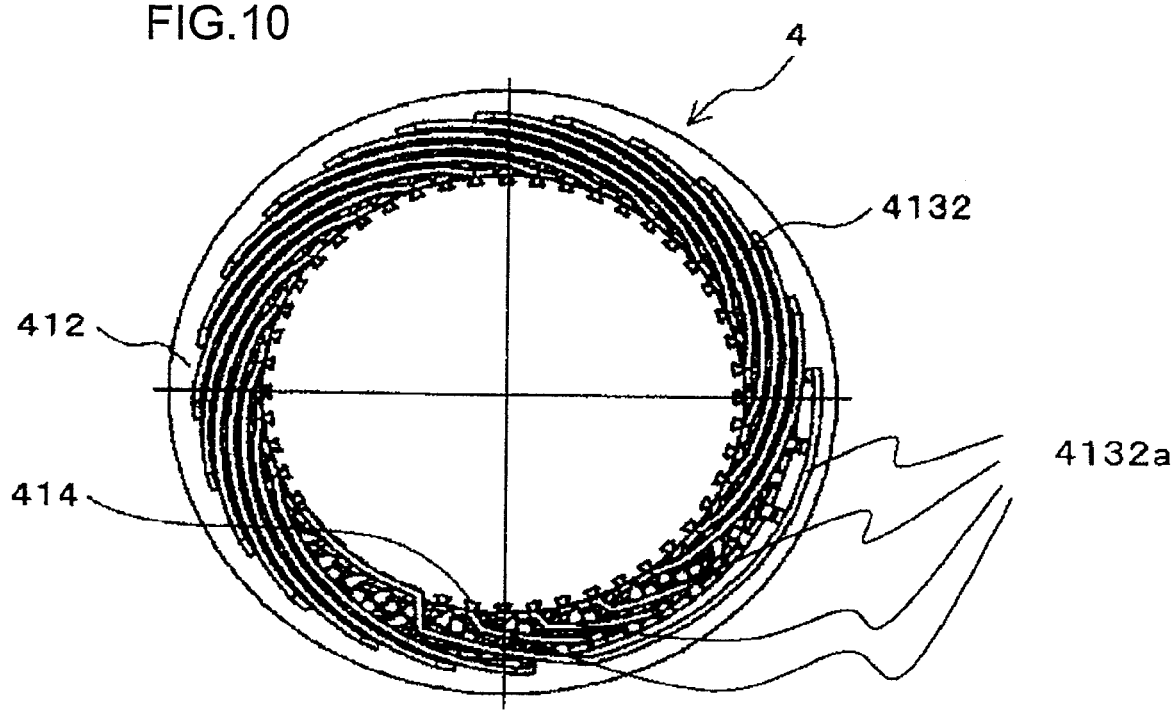
FIG. 10 is a front view of a stator.
Figure 11:
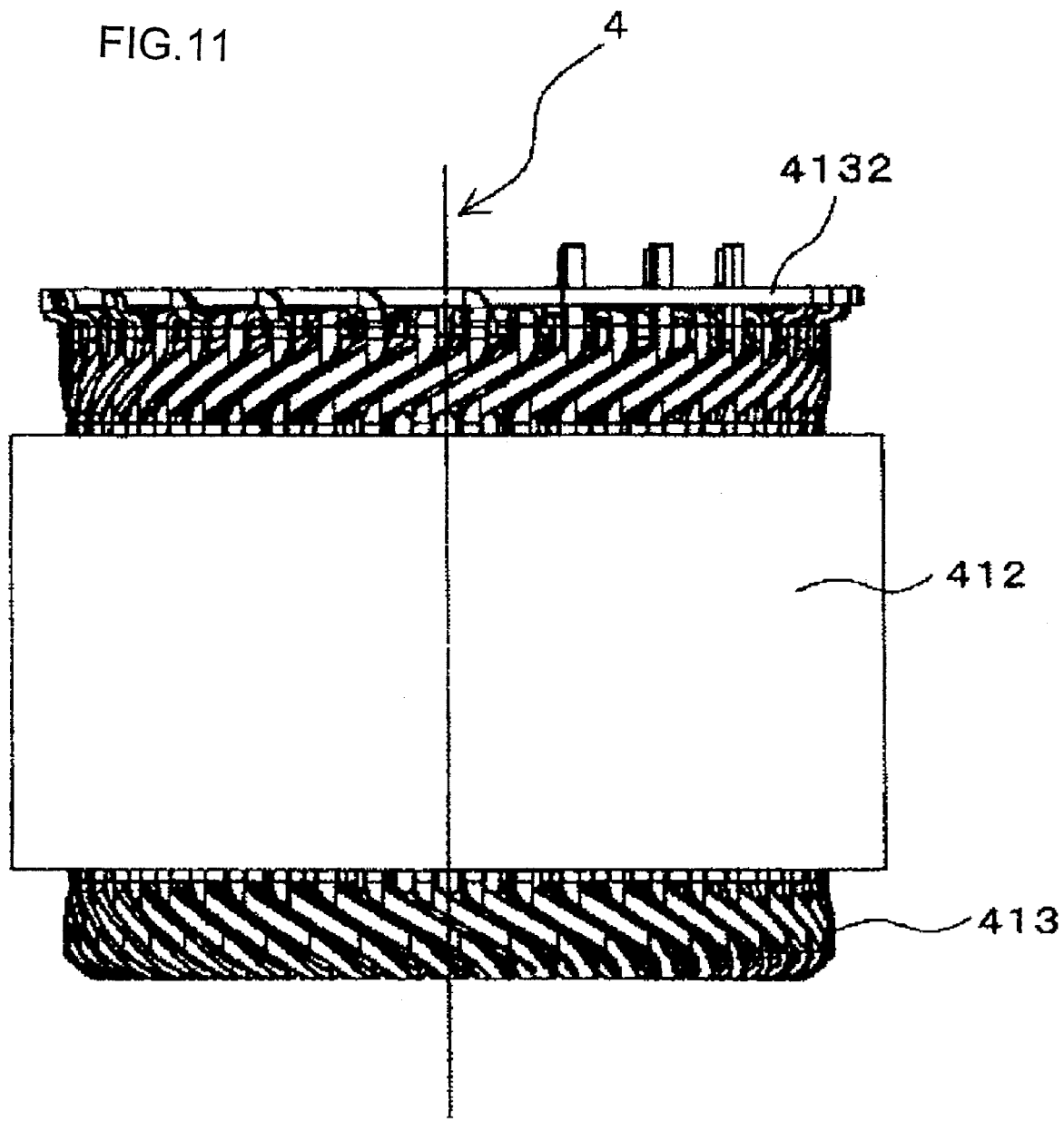
FIG. 11 is a side elevation of a stator.
Figure 12:
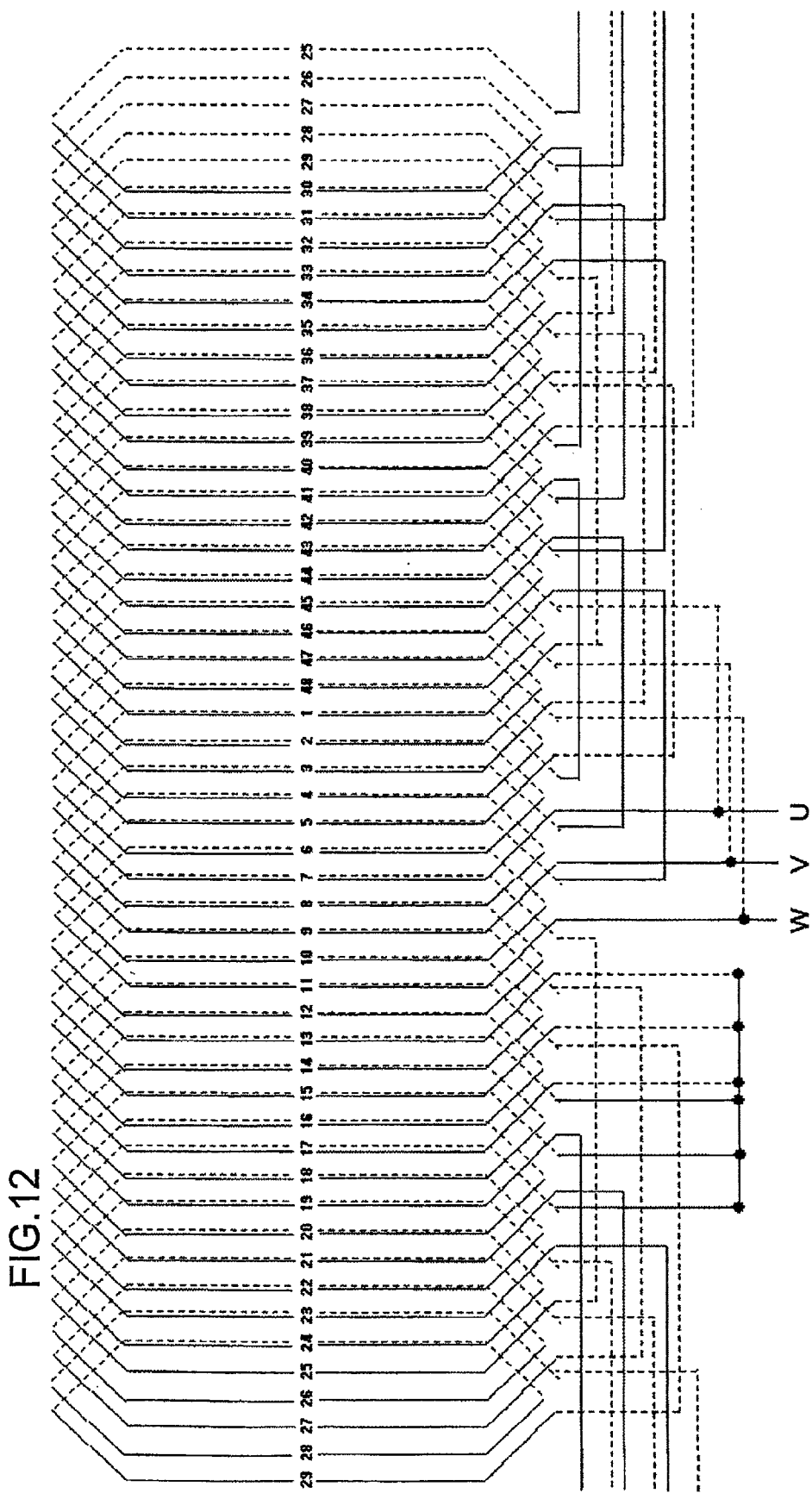
FIG. 12 is a connection diagram pertaining to the stator coil.

FIG. 4 presents a connection diagram of the stator coil 413 assuming a 2Y connection as explained earlier. FIG. 7 is a perspective of the stator 4, FIG. 8 is a perspective of a single continuous coil used to constitute the stator coil 413, FIG. 9 is a perspective of the coil corresponding to a single phase, FIG. 10 is a plan view of the stator 4, FIG. 11 is a side elevation of the stator 4, FIG. 12 is a connection diagram of the stator coil 413 and FIG. 13 shows the relationship between the numbers assigned to the slot at the stator 4 and the coil segments constituting the stator coil 413.

The stator 4 in FIG. 7 includes a stator core 412 having 48 slots 411 formed along the circumferential direction over equal intervals and a stator coil 413 wound through the slots 411.

The stator core 412 may be constituted with a laminated steel sheet assembly obtained by forming an electromagnetic steel sheet with a thickness of approximately 0.05~1 mm through punching or etching and layering a plurality of such electromagnetic steel sheets one on top of another. A plurality of slots 411 ranging radially are formed over equal intervals along the circumferential direction at the stator core 412. In the embodiment, 48 such slots 411 are formed.

Teeth 414 are formed between the slots 411. The individual teeth 414 are formed as integrated part of the ring-shaped core back 430. Namely, the teeth 414 and the core back 430 are formed through integral molding.

In addition, the slots 411 each include an open end located on the inner circumferential side and the coil segments to constitute the stator coil 413 are inserted through the openings. The slots 411 are open slots with their openings located on the inner circumferential side assuming a width measured along the circumferential direction substantially equal to or slightly greater than the width of the coil mounting portions at the slots, through which the coil segments are inserted.

A holding member 416, which disallows displacement of the coil segments to the inner circumferential side, are installed on the front end side of the teeth 414. It is to be noted that the holding members 416, constituted of a nonmagnetic material such as resin or a nonmagnetic metal material, are each fitted along the axial direction into holding grooves 417 ranging along the axial direction at the two side surfaces along the circumference located on the front end side of the corresponding teeth 414.

Next, the stator coil 413 is described in reference to FIGS. 8 and 9.

While the stator in the first embodiment includes a three-phase stator coil 413 corresponding to three phases, the part of the stator coil 413 corresponding to one of these phases is described below.

It is to be noted that the stator coil 413 in the first embodiment is constituted with a flat wire conductor having a substantially rectangular section, the exterior of which is coated with an insulating film. The longer side of the quadrangular shape assumed at the section of the conductor ranges along the circumference of the stator core 412 and the shorter side of the quadrangular shape ranges along the radius of the stator core.

The surface of the conductor constituting the stator coil 413 is coated with a film for purposes of insulation.

FIG. 4 shows the connection pattern assumed at the stator coil 413.

The stator coil 413 in the embodiment includes two star connections, as shown in FIG. 4. Namely, assuming that the two star connections in FIG. 4 are respectively referred to as a Y1 connection and a Y2 connection, the Y1 connection includes a U-phase winding Y1U, a V-phase winding Y1V and a W-phase winding Y1W. The Y2 connection, on the other hand, includes a U-phase winding Y2U, a V-phase winding Y2V and a W-phase winding Y2W. The Y1 connection and the Y2 connection are connected in parallel to each other, and the respective neutral points are connected via the respective neutral points.

The U-phase winding Y1U in the Y1 connection is constituted with a coil U11, a coil U12, a coil U13 and a coil U14 connected in series. In addition, the U-phase winding Y2U in the Y2 connection is constituted with a coil U21, a coil U22, a coil U23 and a coil U24 connected in series.

The V-phase winding Y1V in the Y1 connection is constituted with a coil V11, a coil V12, a coil V13 and a coil V14 connected in series. The V-phase winding Y2V in the Y2 connection is constituted with a coil V21, a coil V22, a coil V23 and a coil V24 connected in series.

The W-phase winding Y1W in the Y1 connection is constituted with a coil W11, a coil W12, a coil W13 and a coil W14 connected in series. The W-phase winding Y2W in the Y2 connection is constituted with a coil W21, a coil W22, a coil W23 and a coil W24 connected in series.

The coils U11 through W24 each include two coil segments, as shown in FIG. 4.

For instance, the coil U11 in FIG. 4 is constituted with a coil segment 2 and a coil segment 1 connected in series. In FIG. 4, the numerals (e.g., 1 and 2) assigned to the coil segments constituting the coil U11, for instance, indicate the slot numbers assigned to the slots at which the coil segments are inserted toward the rotor side.

Namely, the coil U11 is constituted with the coil segment corresponding to slot number 2 and the coil segment corresponding to slot number 1, connected in series. Likewise, the coil U12 is constituted with the coil segment corresponding to slot number 38 and the coil segment corresponding to slot number 37, connected in series.

Hereafter, the same numeral assignment principle applies and the numeral attached to any coil segment shown in FIG. 4 indicates the number assigned to the slot, through which the particular coil segment is inserted on the side toward the rotor. The last coil W24 is constituted with the coil segment assigned with slot number 11 and the coil segment assigned with slot number 12, connected in series.

Next, the stator coil 413 is described in reference to FIGS. 8 and 9.

Since the U-phase winding Y1U, the V-phase winding Y1V and the W-phase winding Y1W in the Y1 connection and the U-phase winding Y2U, the V-phase winding Y2V and the W-phase winding Y2W in the Y2 connection all assume similar structures, the U-phase winding Y1U in the Y1 connection is now described as a representative example in reference to FIG. 8.

The U-phase winding Y1U in the Y1 connection shown in FIG. 8 includes the coil U11, the coil U12, the coil U13 and the coil U14 connected in series. The coils U11, U12, U13 and U14 are disposed over equal intervals. In other words, the coil U11, the coil U12, the coil U13 and the coil U14 are set over intervals of 90° of mechanical angle.

The coil U11 includes two coil segments, i.e., a coil segment 4131*a* and a coil segment 4131*b*. The coil segment 4131*a* is laid out to wind through the rotor side of the slot 2 and the bottom side of the slot 7. In other words, the coil segment 4131*a* is made to wind through a pair of slots, i.e., the slots 2 and 7, a plurality of times (three times in the embodiment).

Since the continuous wire is wound to range between the rotor side of the slot 2 and the bottom side of the slot 7, as described above, the coil U11 can be wound without having to perform any connection work.

The coil segment 4131*b* constituting the coil U11 in the embodiment is laid out to wind through the rotor side of the slot 1 and the bottom side of the slot 6 three times. In other words, the coil segments 4131*a* and 4131*b* are each wound so as to range between two slots. The coil segments 4131*a* and 4131*b* are each disposed on the rotor side at one of the two slots and they are each disposed on the bottom side of the other slot.

The coil segments 4131*a* and 4131*b* are connected in series via an inter-coil connector wire 4134. The area where they are serially connected, too, is constituted with a continuous wire, eliminating the need for special connection work. The coil segments 4131, each wound through two slots as described above, assume a substantially hexagonal shape when they are mounted at the stator core 412 of the stator 4, and are wound so as to each range in the coil end across the inner circumferential side, i.e., the side of one of the slots i.e., the slot 411, located toward the rotor 5 and the outer circumferential side, i.e., the bottom side of the other slot.

The coil segment is wound through the space between one of the slots, i.e., the slot 2 or the slot 1, and the other slot, i.e., the slot 7 or the slot 6, through lap winding by determining the number of laps based upon the number of slots and the number of poles at the stator 4.

The coil segments 4131*a* and 4131*b* assuming a wound structure are constituted with a continuous wire and by adopting the method to be detailed here, the inter-coil connector wire 4134 connecting the two coil segments 4131*a* and 4131*b*, too, can be constituted with a continuous wire. This means that while the number of turns at the stator coil 413 is increased, the increase in the number of connection points can be minimized in the embodiment.

In FIG. 8, the winding portion constituted with a pair of coil segments 4131*a* and 4131*b* is disposed at four separate positions set over equal intervals of 90° along the circumferential direction.

The coil portion extending from the inner circumferential side of the coiled area in a pair of coil segments 4131a and 4131b and the coil portion extending from the outer circumferential side in another pair of coil segments 4131a and 4131b are connected at their apexes in the coil end. The apexes in the coil end are connected through a crossover wire 4132.

In the first embodiment, it is to be noted that the coil extending from the inner circumferential side of a coil pair, i.e., the coil segments 4131a and 4131b constituting a winding portion and the coil extending from the outer circumferential side of the coil pair constituting another winding portion are wound continuous to each other. This means that the four winding portions, each constituted with a coil pair made up with coil segments 4131a and 4131b, set next to each other, are formed by using a coil constituted with a single continuous conductor.

In addition, the crossover wire 4132 is disposed only at one end of the stator 4 along the axial direction and is made to traverse the stator 4 from the outer circumferential side of the stator core 412 toward the inner circumferential side of the stator core 412.

The single coil assembly shown in FIG. 8 constitutes half of the stator coil 413 corresponding to a given phase (U-phase). The full stator coil 413 corresponding to the phase (U-phase) is formed by combining the U-phase winding Y1U in the Y1 connection illustrated in FIG. 8 and the U-phase winding Y2U in the Y2 connection identical to the Y1 connection, with the U-phase winding Y2U offset relative to the U-phase winding Y1U in the Y1 connection by a mechanical angle of 45°.

The coil pairs, each made up with coil segments 4131a and 4131b, constituting the winding portions of similar coil formation are disposed with a shift of 45° of mechanical angle. The coil segment 4131a in the coil U11 is disposed at the slot 2 toward the rotor 5, whereas the coil segment 4131b constituting the coil U11 is disposed at the slot 1 toward the rotor 5.

The coil segment 4131a in the coil U21 disposed with the 45° of mechanical angle offset and constituting a winding portion in the other coil assembly is wound through the slot 44 toward the rotor 5 and the slot 1 toward the bottom side. The coil segment 4131b constituting the coil U21, on the other hand, is wound through the slot 43 toward the rotor 5 and the slot 48 on the bottom side.

As shown in FIG. 9, the stator coil 413, constituted with a three-phase coil assembly, is formed by disposing stator coils 413 with offset along the circumferential direction by 15° and by 30°. In short, by adopting the embodiment, a three-phase stator coil 413 can be wound at the stator core 412 with the minimum number of connection points.

In addition, as shown in FIG. 10, the crossover wire 4132 at each coil assembly is disposed so as to range across the outer circumferential side through the inner circumferential side at the stator core 412. Thus, the crossover wire 4132 at the coil assembly assumes a substantially spiral-like pattern.

At positions to be assumed for neutral points in the star connection, the terminals of the individual coil segments and separate crossover wires constituted of different wires instead of the crossover wire 4132 of a continuous coil, need to be connected through TIG welding or the like.

It is to be noted that the crossover wire 4132 used for connection at the neutral points, too, is disposed so as to range across the outer circumferential side and the inner circumferential side of the stator core 412, as shown in FIG. 10. Thus, the stator coil 413 assuming a regular cohesive structural arrangement can be installed by utilizing the available space efficiently, which ultimately makes it possible to provide the rotating electrical machine as a compact unit.

FIG. 13 presents a diagram indicating the relationship with which the coil segments constituting the stator coil 413 are disposed at specific slots.

The individual slot numbers, indicated in a slot number field 442 in FIG. 13, are assigned sequentially to the 48 slots starting with a predetermined slot. The individual coils, i.e., the coils U11 through W24 constituting the stator coil 413 shown in FIG. 4 are each indicated by the slot numbers assigned to the slots formed at the stator on the side toward the rotor 5, as shown in FIG. 13. The relationship between the coil segments constituting the specific coils U11 through W24 and the slots is indicated on the lower side of the field 442 in FIG. 13.

For instance, the coil W13 is indicated by slot numbers 29 and 30 in the field 442 in FIG. 13. Namely, the coil W13 is formed by connecting in series the coil segment disposed at the slot 29 toward the rotor 5 and the coil segment disposed at the slot 30 toward the rotor 5. Accordingly, the coil segments constituting the coil W13 are indicated by coil numbers 29 and 30 in FIG. 4, as well.

In addition, the coil U22 is indicated by slot numbers 31 and 32 in the field 442 in FIG. 13. Namely, the coil U22 is formed by connecting in series the coil segment disposed at the slot 31 toward the rotor 5 and the coil segment disposed at the slot 32 toward the rotor 5. Accordingly, the coil segments constituting the coil U22 are indicated by coil numbers 31 and 32 in FIG. 4, as well.

In FIG. 8, the coil U11 is indicated by slot numbers 1 and 2. This means that the coil U11 is constituted by connecting in series the coil segment 4131b disposed at the slot 1 on the side toward the rotor 5 and the coil segment 4131a at the slot 2 disposed on the side toward the rotor 5. Accordingly, the coil segments constituting the coil U11 are indicated by coil numbers 1 and 2 in FIG. 4.

The phases assumed at the stator coil 413 and the positional order with which the coil segments are disposed at the individual phases are indicated in a field 444 in FIG. 13.

The coil U11 is assigned with slot numbers 1 and 2, as indicated in the field 442 in FIG. 13. This means that the coil U11 is formed by connecting in series the coil segments 4131b and 4131a respectively disposed at slots 1 and 2. In the field 444 in FIG. 13, the coil segments constituting the coil U11 are both marked "U1". This indicates that the coil U11 assumes the first position in the U-phase, i.e., the U-phase reference position at the stator coil 413.

In the field 444 in FIG. 13, the coil segments constituting the coil U21 are both marked "U2". This indicates that the coil U21 assumes the second position in the U-phase, i.e., the position offset by 45° of mechanical angle from the U-phase reference position at the stator coil 413.

Likewise, in the field 444 in FIG. 13, the coil segments constituting the coil U12 are both marked "U3". This indicates that the coil U12 assumes the third position in the U-phase, i.e., the position offset by 90° of mechanical angle from the U-phase reference position at the stator coil 413.

These particulars have been already described in reference to FIG. 8 illustrating the connection state at the U-phase winding Y1U in the Y1 connection.

The V-phase coil V11 at the stator coil 413 is disposed with an offset of 15° of mechanical angle relative to the U-phase coil U11 at the stator coil 413. The coil V21 marked "V2" in the field 444 in FIG. 13 assumes a position offset by 45° of mechanical angle from the position taken up by the coil V11 set with an offset of 15° of mechanical angle relative to the reference position assumed by the U-phase coil U11 at the stator coil 413.

The V-phase coils at the stator coil 413 are all disposed in reference to the coil V11 and are thus all offset by 15° relative to the U-phase coils at the stator coil 413. Likewise, since the W-phase coil W11 at the stator coil 413 is set with an offset by 30° of mechanical angle from the position taken up by the U-phase coil U11 at the stator coil 413, the W-phase coils are all offset by 30° relative to the U-phase coils at the stator coil 413.

Next, a field 446 in FIG. 13 is explained.

In the embodiment, each coil segment 4131 is wound through two slots. Namely, the coil segment 4131a in FIG. 8 is wound through the slots 2 and 7. More specifically, the coil segment 4131a is disposed on the side toward the rotor 5 through the slot 2 and is disposed further inward through the other slot 7.

While the slot number assigned to one of the slots through which each coil segment is wound is indicated in the field 442 in FIG. 13, the slot number assigned to the other slot through which the coil segment is wound is indicated in the field 446 in FIG. 13.

Namely, slot number "7" is indicated in the field 446 in correspondence to slot number "2" in the field 442. This means that the coil segment is wound through the slot assigned with slot number 2 and also through the other slot assigned with slot number 7.

In this manner, one of the slots through which each coil segment is wound and the other slot through which the same coil segment is wound are indicated respectively in the field 442 and in the field 446 in FIG. 13.

In a field 448 in FIG. 13, the phase of the coil segment disposed further inward relative to each coil indicated by a specific slot number in the field 442 and the positional order in which the coil segment is set in the particular phase are indicated.

In a field 450 in FIG. 13, the slot through which the coil segment indicated in the corresponding position in the field 448 is wound is indicated. For instance, the field 450 in FIG. 13 indicates that the coil segment disposed at the bottom side of a slot indicated by slot number 2 in the field 442 in FIG. 13 takes up the second position in the V-phase. In addition, "45" in the field 450 in FIG. 13 indicates that the coil segment disposed at the bottom side of a slot indicated by slot number 2 is wound through two slots, one of which is assigned with slot number "45" and the other assigned with slot number "2".

In correspondence to slot number 45 in the field 442 in FIG. 13, "2" is indicated in the field 446. These numbers indicate the same coil segment as that described above. Namely, the coil segment wound through the slot 45 and the other slot 2 is disposed at the second position in the V-phase.

FIG. 12 shows the ultimate state of connection achieved at the stator coil 413 assuming the connection pattern described above.

It is to be noted that while the winding portions 4131 are formed with coil segments each wound once in FIG. 12, the coil segments are actually each wound three times, as explained earlier.

In addition, specific numbers are indicated in the middle of the winding portions 4131 in FIG. 12. In FIG. 12, each coil segment indicated by a dotted line assumes the position on the inner circumferential side of the corresponding slot 411, i.e., the position toward the slot opening, whereas each coil segment indicated by a solid line assumes the position on the outer side at the corresponding slot 411, i.e., toward the bottom side of the slot.

The wire intersecting points indicated by the filled circles in FIG. 12 are positions at which the wire needs to be connected through welding. As FIG. 12 clearly indicates, the wire must be connected through welding only at nine positions.

In the structure described in reference to FIGS. 4 and 13, a plurality of conductors are disposed side-by-side along the radial direction at each slot so as to form a coil segment with the conductors wound through two slots.

Since such a winding coil segment is constituted with continuous conductors, a significant number of turns is achieved without a significant increase in the number of connection points in the first embodiment. In addition, only a single conductor ranges along the circumferential direction in each slot in the first embodiment.

The structure assumed in the rotating electrical machine in the first embodiment facilitates the manufacturing process as explained below. In addition, since the conductors in the rotating electrical machine assume a shape that is wide along the circumferential direction and narrow along the radial direction, the occurrence of eddy currents induced at the conductors inside the slots by magnetic flux leakage is minimized. Thus, the efficiency is improved and heat generation is inhibited in the rotating electrical machine in the embodiment.

As shown in FIG. 11, the crossover wire 4132 is disposed on substantially a single flat plane located at one end of the stator 4 along the axial direction, so as to minimize the length of the coil end.

As described above, the crossover wire 4132 is disposed further outside the coil ends along the rotating direction, achieving a streamlined positional arrangement overall, thus making it possible to provide the entire rotating electrical machine as a compact unit in the first embodiment. In addition, better reliability is assured with regard to electrical insulation. More specifically, rotating electrical machines used to drive vehicles today are operated at high voltage, sometimes exceeding 100V. In some cases, electrical rotating machines may operate at voltages of 400V or 600V. In short, it is crucial to assure a high level of reliability in wiring connections at the stator coil.

In the first embodiment described above, a coil segment 4131a wound with a plurality of turns and the corresponding coil segment 4131b wound over the same number of turns are connected via an inter-coil connector wire 4134. The crossover wire 4132 is disposed further outside the inter-coil connector wire 4134, achieving a streamlined positional arrangement over all. This structural feature, too, makes it possible to provide the rotating electrical machine as a compact unit and assure a high level of reliability with regard to electrical insulation.

Next, in reference to FIGS. 14 through 17 and 25, the stator 4 achieved in the first embodiment described above is explained in detail.

Figure 14:
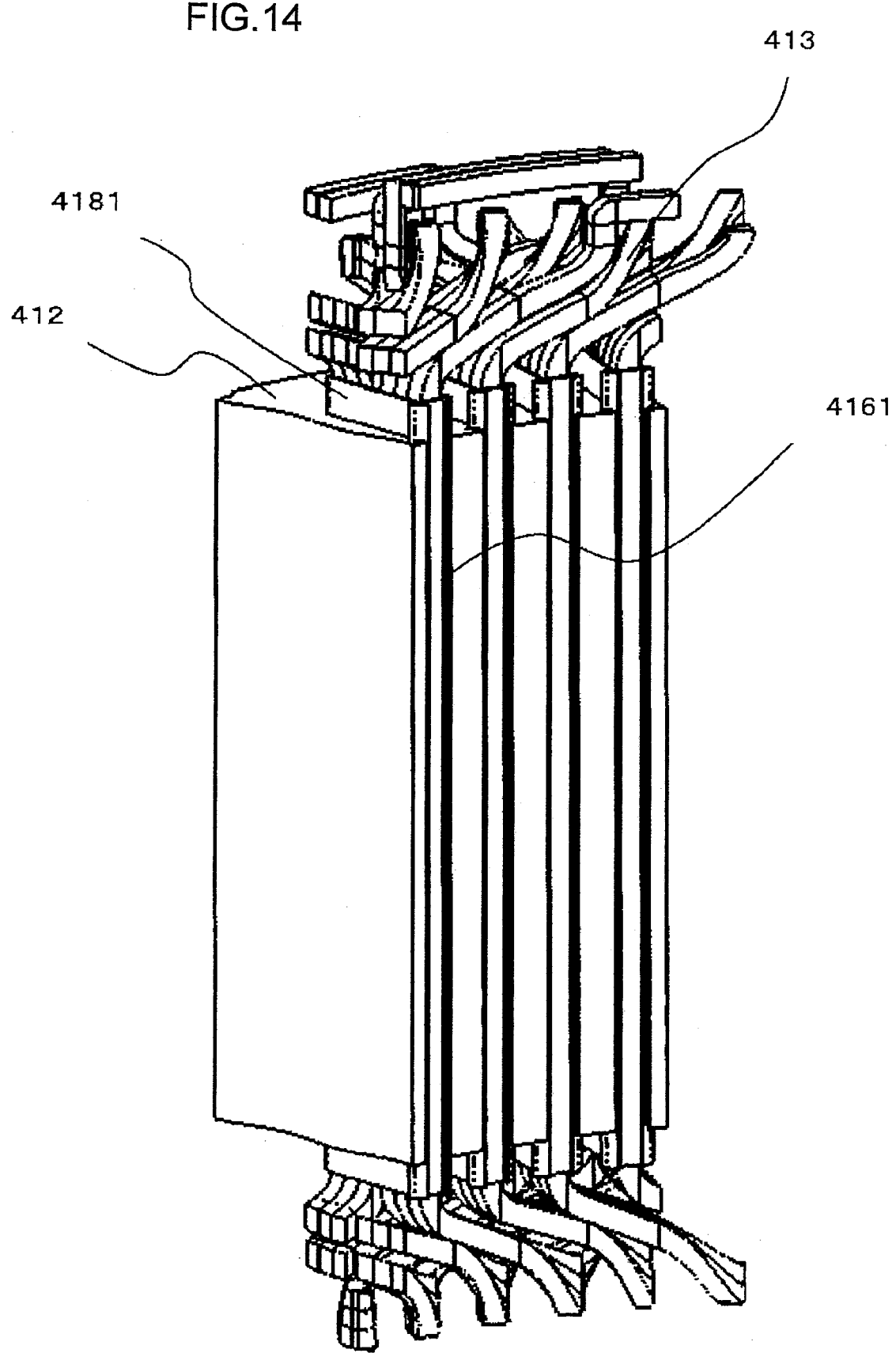
FIG. 14 is a perspective showing part of the stator achieved in the first embodiment in an enlargement.
Figure 15:
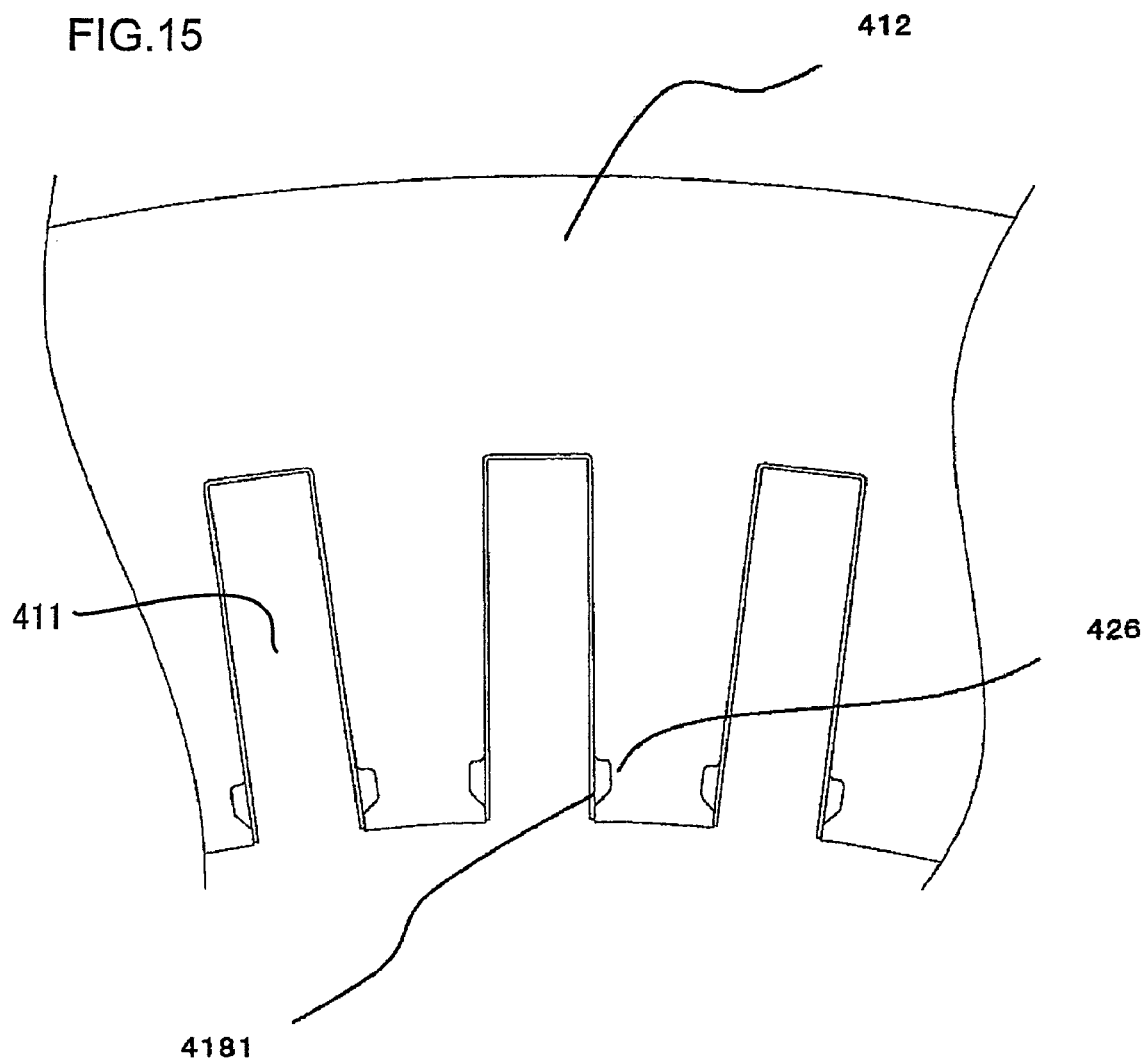
FIG. 15 is a sectional view showing slot insulators inserted in the stator slots in the first embodiment in a partial enlargement.

FIG. 14 is a perspective showing the stator 4 achieved in the first embodiment in a partial enlargement. FIG. 15 is an enlarged sectional view of stator slots with slot insulators 4181 inserted therein, taken over a plane perpendicular to the rotational axis.

Figure 16:
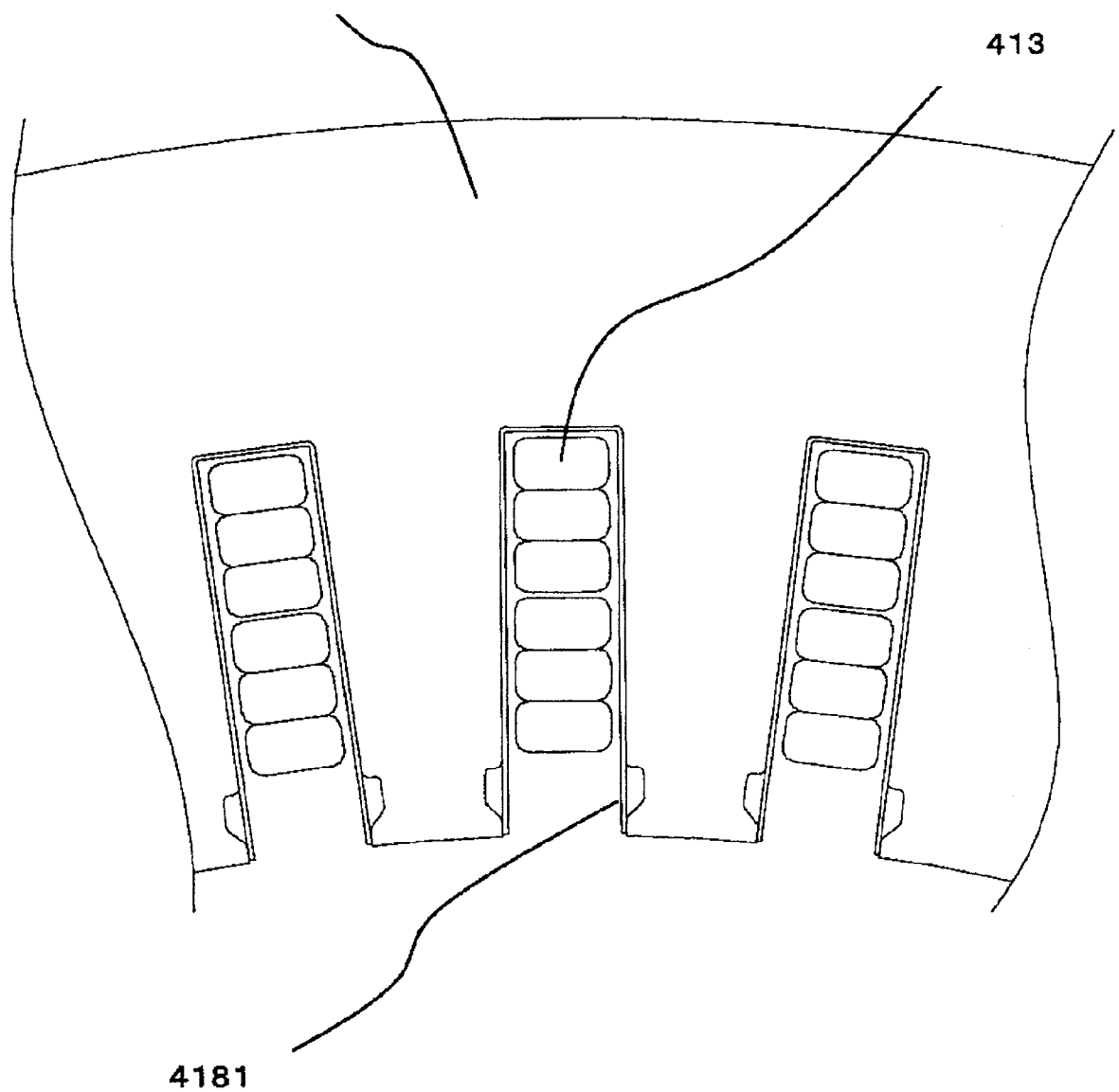
FIG. 16 is a sectional view showing slot insulators and stator coil segments inserted in the stator slots in the first embodiment in a partial enlargement.
Figure 17:
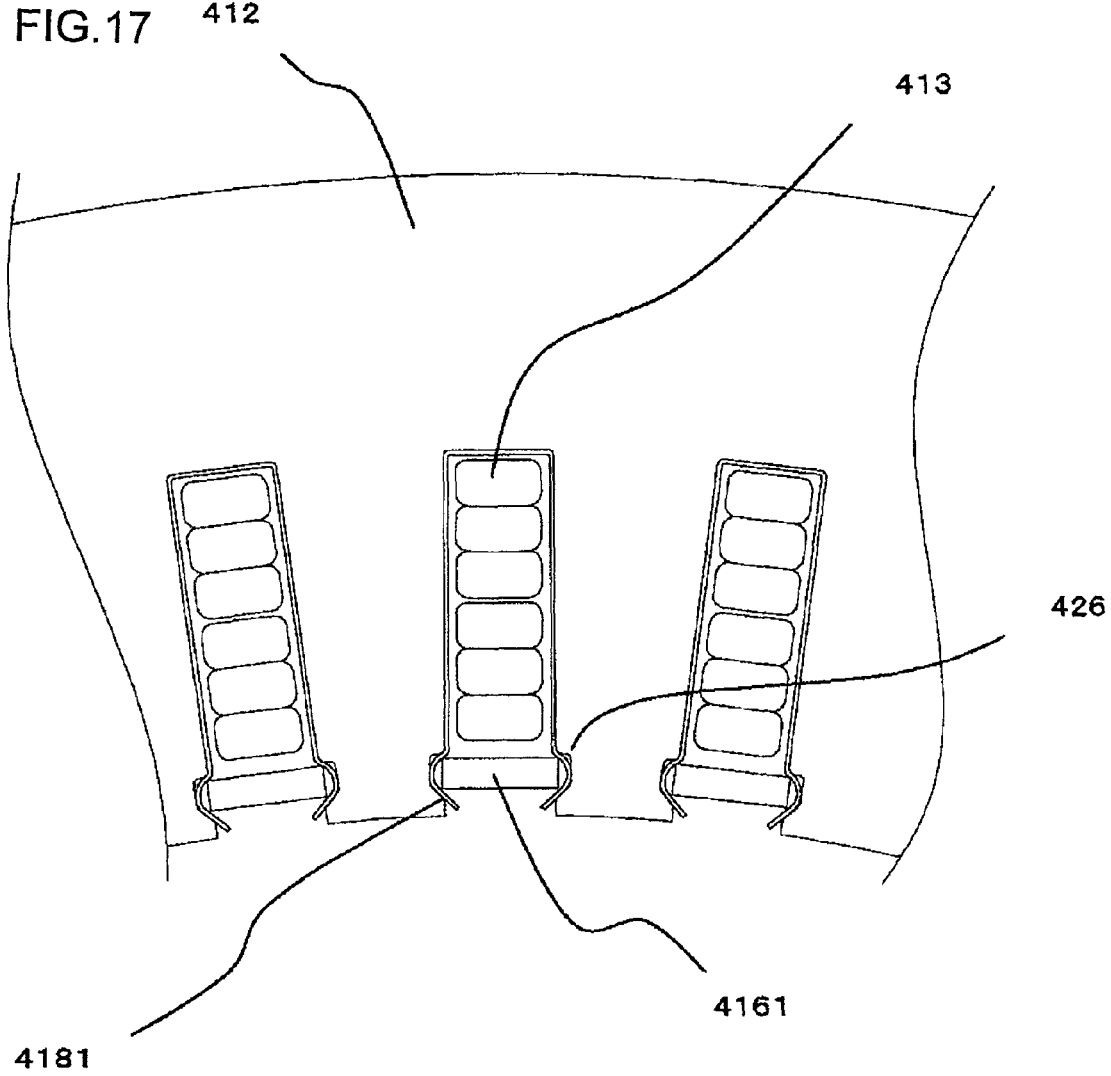
FIG. 17 is a sectional view showing slot insulators, stator coil segments and holding members inserted in the stator slots in the first embodiment in a partial enlargement.
Figure 25:
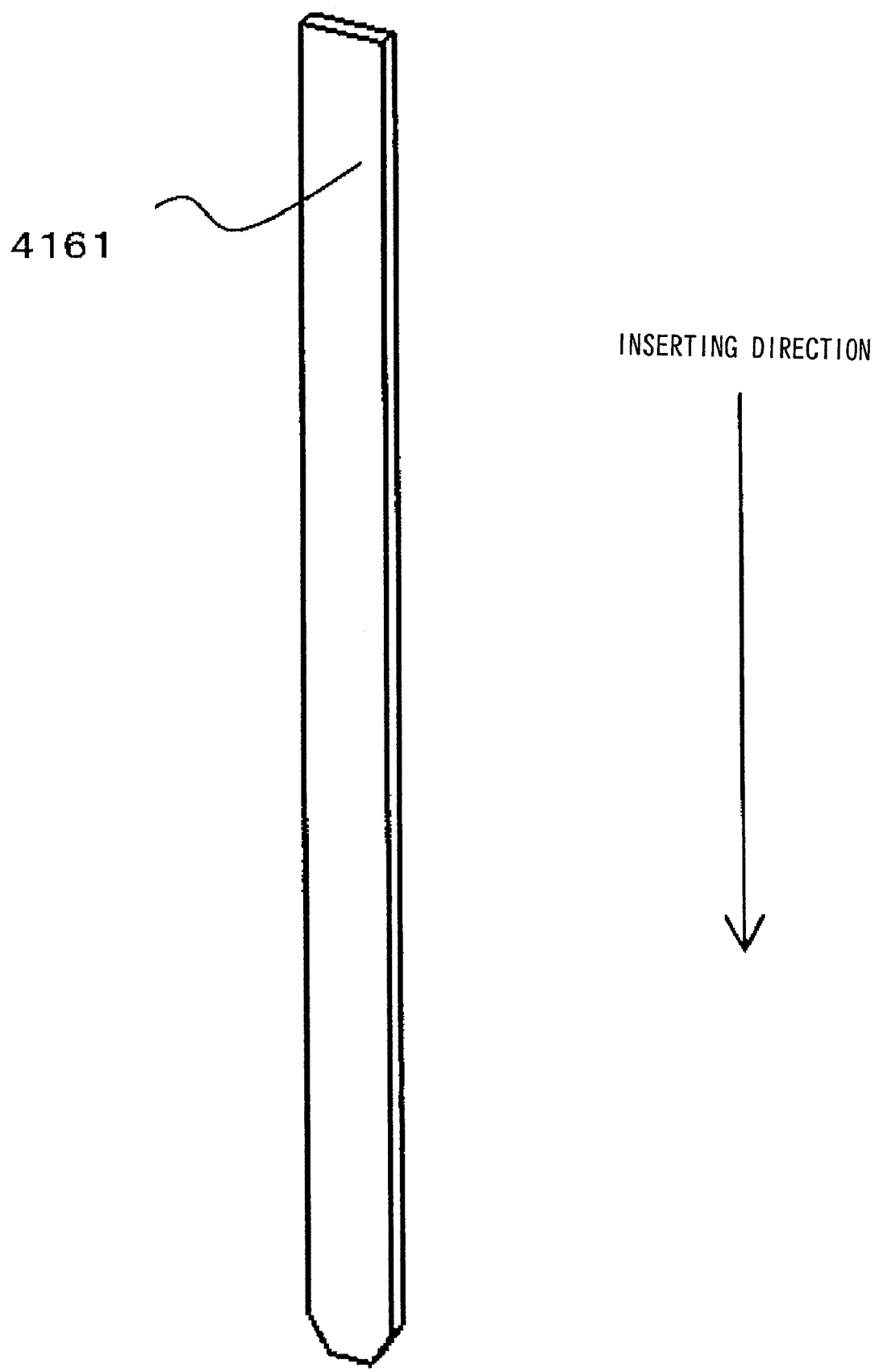
FIG. 25 shows the shape adopted for the holding member in the first embodiment.

FIG. 16 is an enlarged sectional view showing a substantially rectangular stator coil 413 inserted in the slots in FIG. 15, FIG. 17 is an enlarged sectional view showing holding members 4161 inserted in the slots in FIG. 16 and FIG. 25 shows the shape that may be assumed for the holding members 4161.

FIG. 14 shows a stator 4 constituted with a stator core 412 with 48 slots 411 formed therein along the circumferential direction with equal intervals and a stator coil 413 wound through the slots 411.

At the stator 4, the stator coil 413 is wound around through the slots 411 at the stator core 412 as shown in FIG. 14. At the wall surfaces of the slots 411 formed at the stator core 412, slot insulators 4181 and holding members 4161 are mounted so as to assure a sufficient distance for insulating the stator coil 413 from the stator core 412.

In reference to FIGS. 15 through 17 and 25, the insulation structure achieved at the stator 4 is described.

As shown in FIG. 15, slot insulators 4181 are inserted in advance at the slots in the stator core 412.

The slot insulators 4181 are formed so that their width substantially matches the width of the slots into which they are inserted. In other words, they are not formed to assume a shape confirming to the shape of holding member insertion grooves 426. In addition, the slot insulators 4181 are formed so that a measurement taken at the front ends thereof along the radius of the stator 4, substantially matches the inner radius of the stator.

The stator coil 413 is inserted as shown in FIG. 16 into the slots 411 shown in FIG. 15.

When inserting the stator coil 413 from the inner circumferential side of the stator 4, the slot insulators 4181 assume the state illustrated in FIG. 15 so as to prevent any damage that might otherwise be caused by contact between the stator coil 413 and the stator core 412.

Once the stator coil 413 is inserted in the slots 411, the holding members 4161 are inserted further inward relative to the slot insulators 4181 in the slots along the direction extending along the rotational axis, as shown in FIG. 17.

The width of the holding members 4161 to be inserted further inward relative to the slot insulators 4181 is set greater than the inner width of the slot insulators 4181.

In addition, the holding members 4161 assume a tapered shape, as shown in FIG. 25, with the front end, which is inserted first, assuming a smaller width. Thus, the slot insulators 4181 are formed to range along the contour of the holding member insertion grooves (holding grooves) 426 shown in FIG. 17, and a sufficient insulation distance is sustained between the stator coil 413 and the stator core 412. As shown in FIG. 15, the inner circumferential side surfaces of the holding grooves 426 incline toward the inner circumferential side of the stator core 412.

This structure eliminates the need to fold back the opening portions of the slot insulators 4181 after inserting the stator coil 413, making it possible to improve the productivity while assuring a high level of reliability.

Second Embodiment

Figure 18:
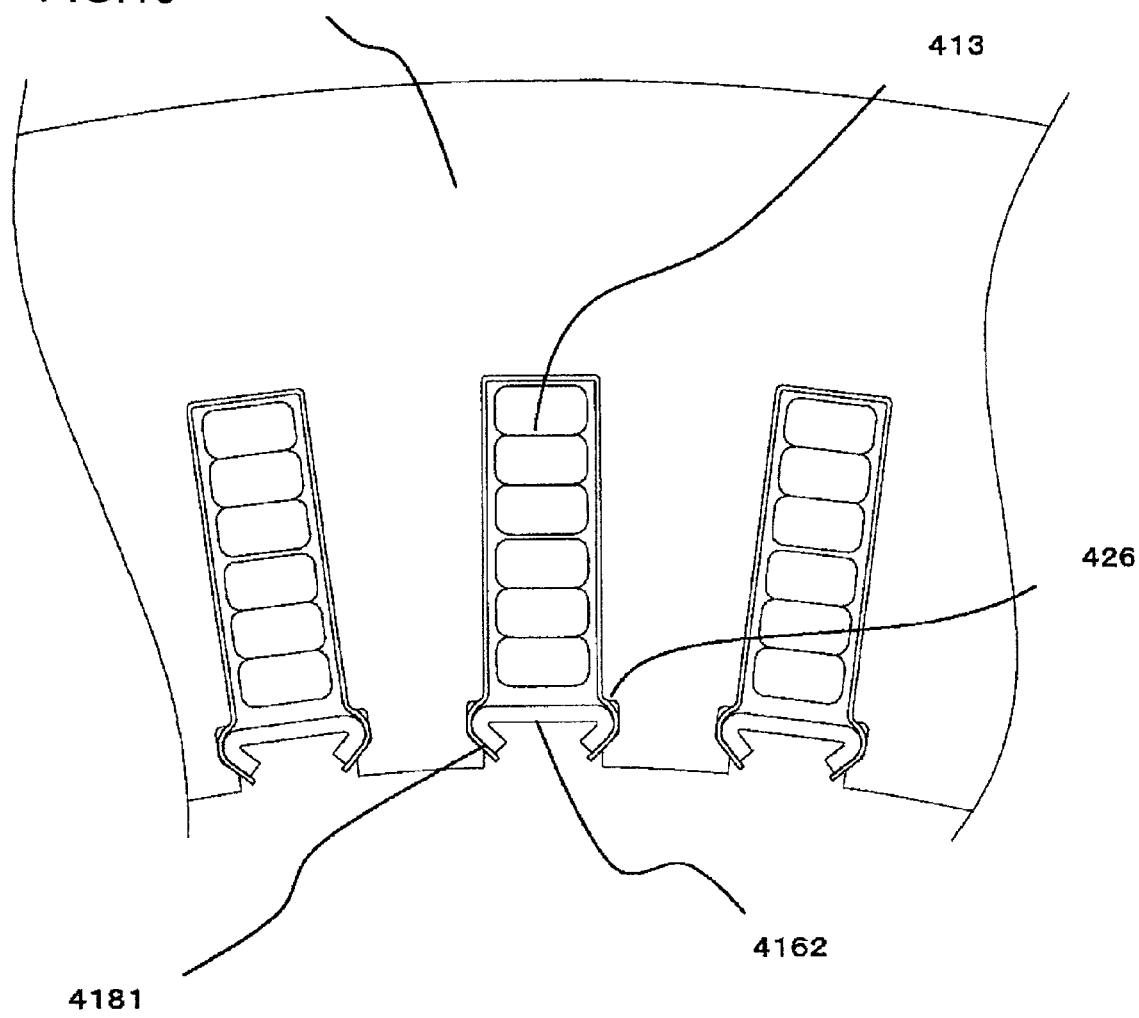
FIG. 18 is a sectional view showing slot insulators, stator coil segments and holding members inserted in the stator slots in a second embodiment in a partial enlargement.

Next, in reference to FIG. 18, the stator 4 according to the second embodiment is described in detail.

FIG. 18 is an enlarged sectional view of stator slots at the stator 4 achieved in the second embodiment, taken over a plane perpendicular to the rotational axis.

It is to be noted that the same terms and reference numerals are assigned to components and portions identical to those in the first embodiment.

Once the stator coil 413 is inserted in the slots 411, the holding members 4162 are inserted further inward relative to the slot insulators 4181 in the slots, along the direction extending along the rotational axis, as shown in FIG. 18.

The holding members 4162, inserted further inward relative to the slot insulators 4181, each include two folded ends located at the two endpoints along the width-wise direction. Namely, the holding members 4162 assume a substantially U-shape. Such holding members 4162 assure a high level of rigidity even when their thickness is small. By folding back the ends of each holding member at the two endpoints along the width-wise direction, any angular portion of the holding member that could otherwise come in contact with a slot insulator 4181 is eliminated. As a result, the holding members 4162 do not damage the slot insulators 4181 and thus, the insulation performance remains intact.

Figure 26:
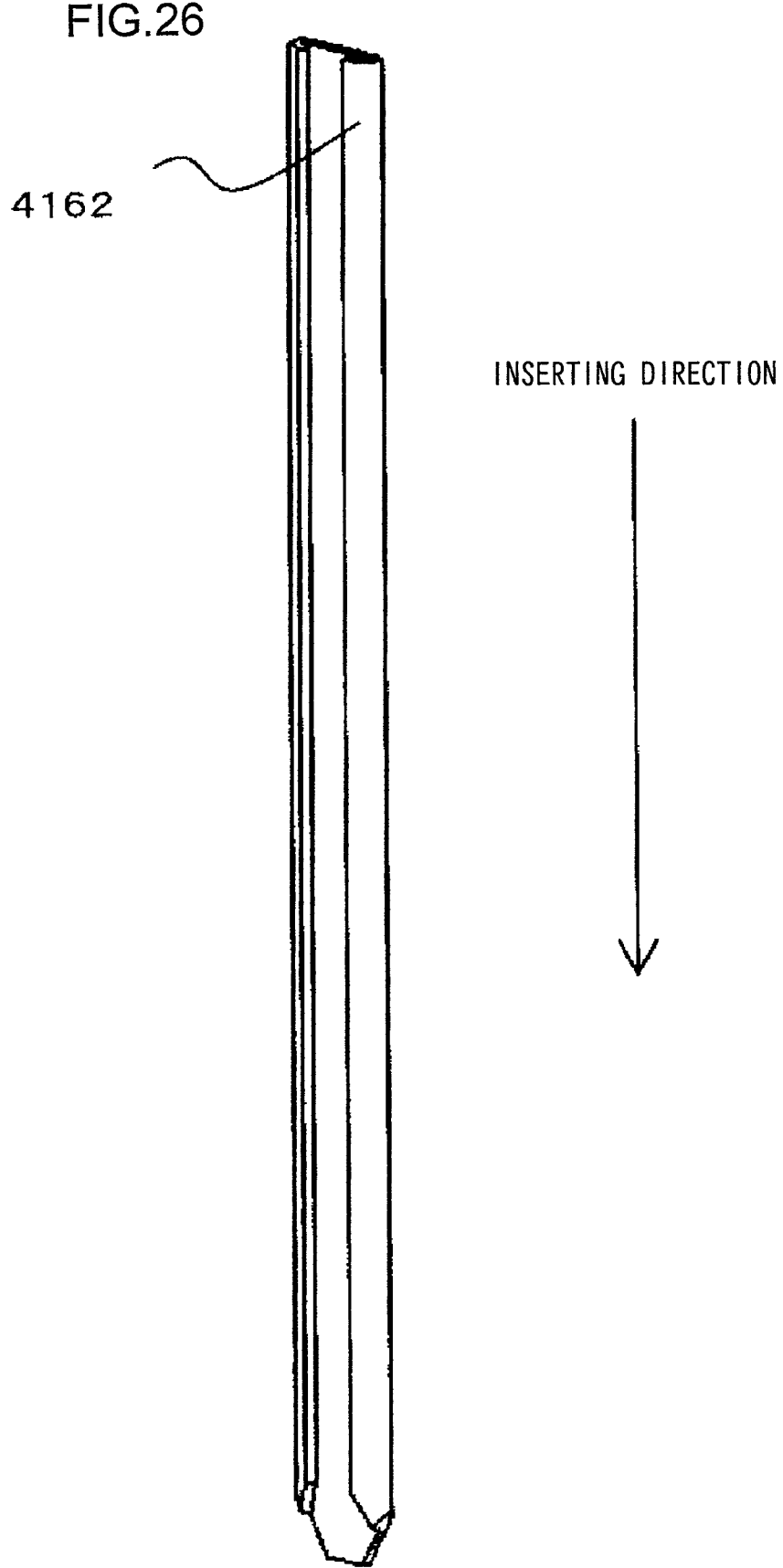
FIG. 26 shows the shape adopted for the holding member in the second embodiment.

The width of the holding members 4162, each having folded ends at the two endpoints along the width wise direction, is set greater than the inner width of the slot insulator 4181. In addition, the holding members 4162 assume a tapered shape, as shown in FIG. 26, with the front end, which is inserted first, assuming a smaller width. Thus, the slot insulators 4181 are formed to range along the contour of the holding member insertion grooves 426 shown in FIG. 18, and a sufficient insulation distance is sustained between the stator coil 413 and the stator core 412.

This structure eliminates the need to fold back the opening portions of the slot insulators 4181 after inserting the stator coil 413, making it possible to improve the productivity while assuring a high level of reliability.

Third Embodiment

Next, in reference to FIGS. 19 through 22, the stator 4 according to the third embodiment is described in detail.

Figure 19:
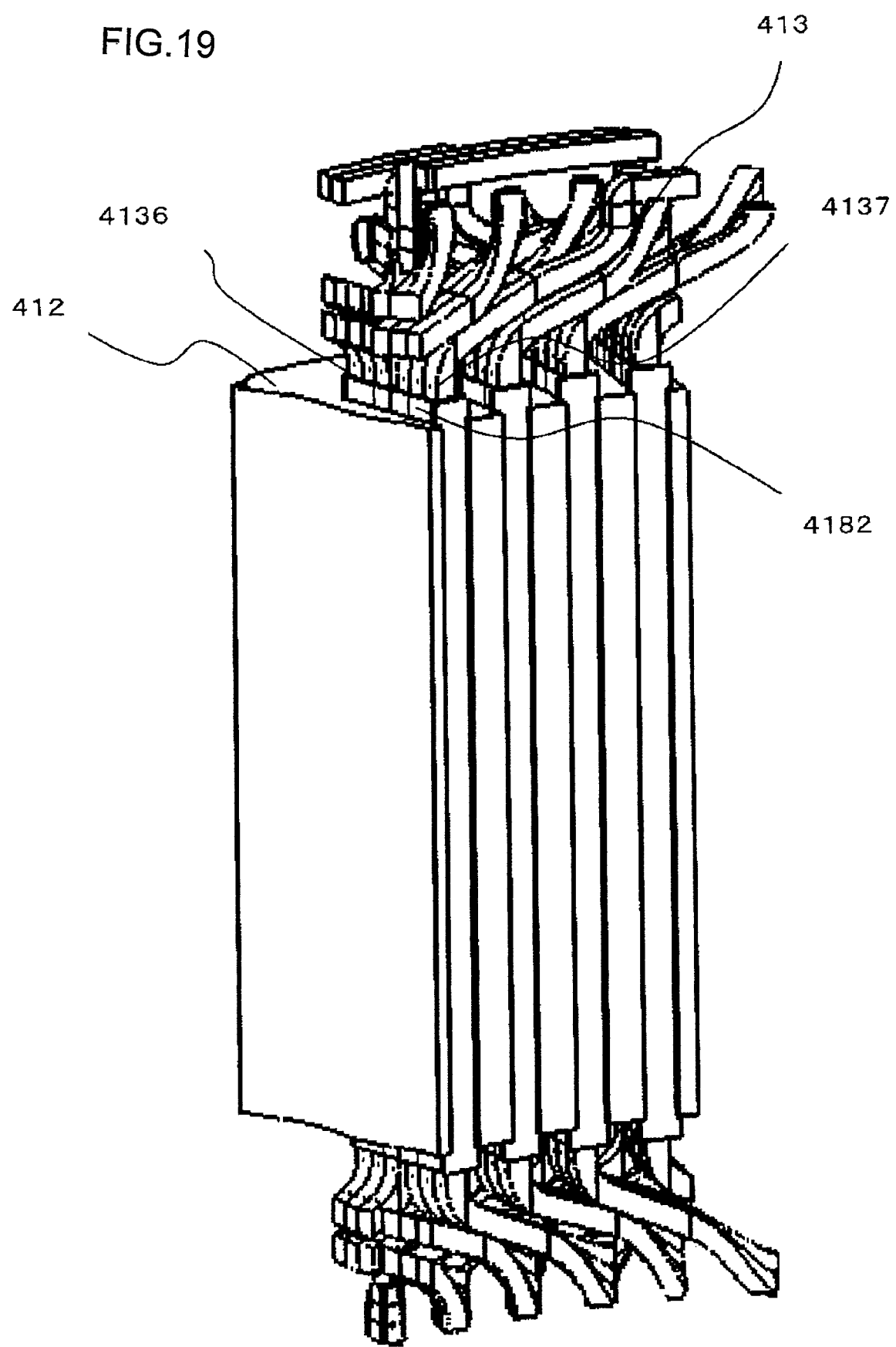
FIG. 19 is a perspective showing part of the stator achieved in a third embodiment in a partial enlargement.
Figure 20:
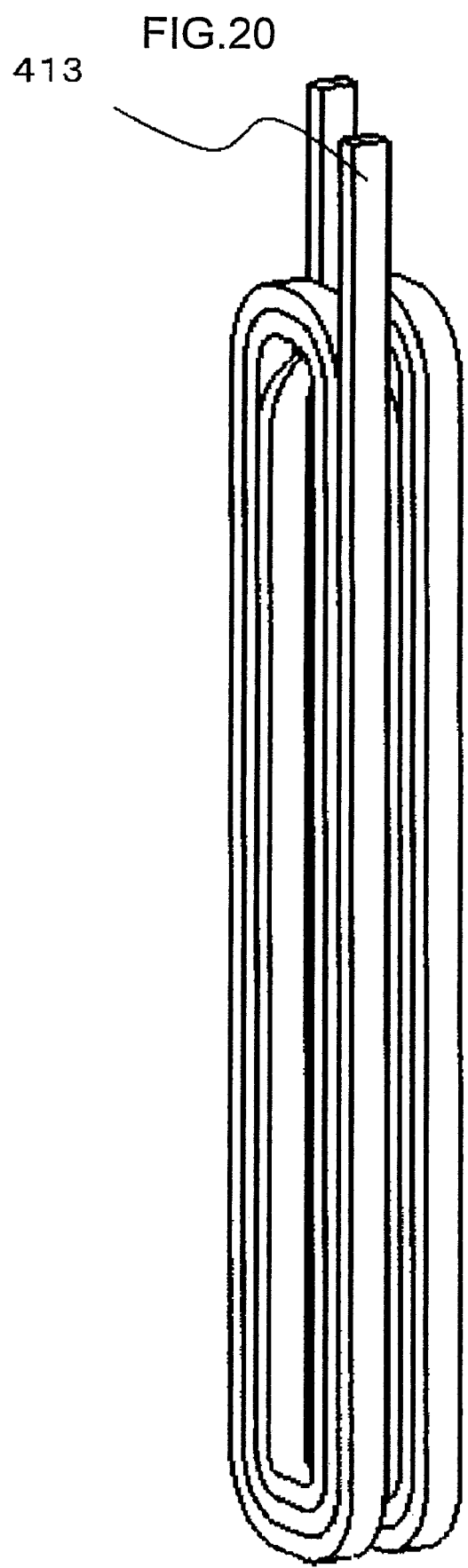
FIG. 20 is a perspective of the stator coil achieved in the third embodiment.

FIG. 19 is a perspective showing the stator 4 achieved in the third embodiment in a partial enlargement and FIG. 20 is a perspective of the stator coil 413 formed in advance, showing two continuous turns.

Figure 21:
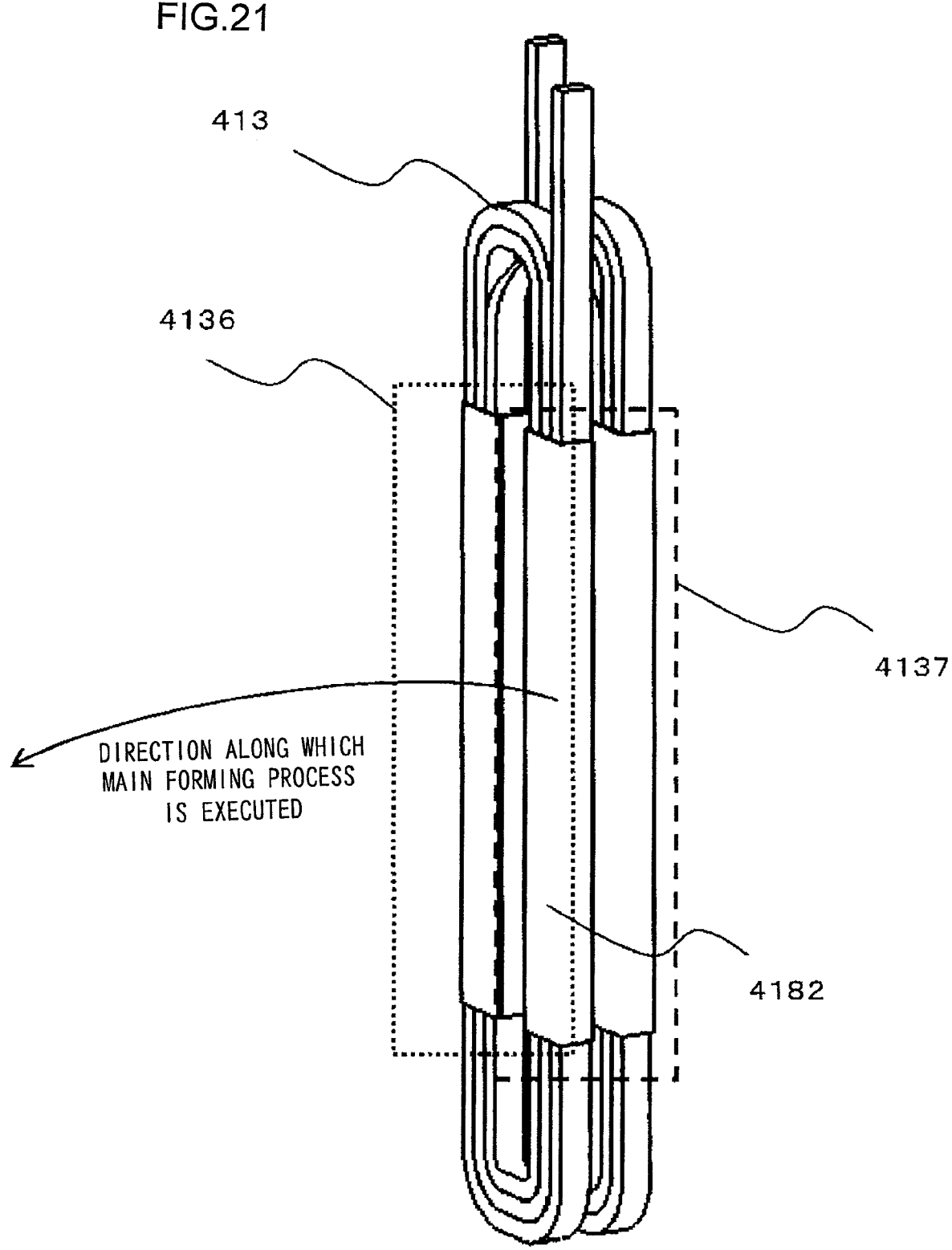
FIG. 21 is a perspective of the stator coil with slot insulators installed therein in the third embodiment.
Figure 22:
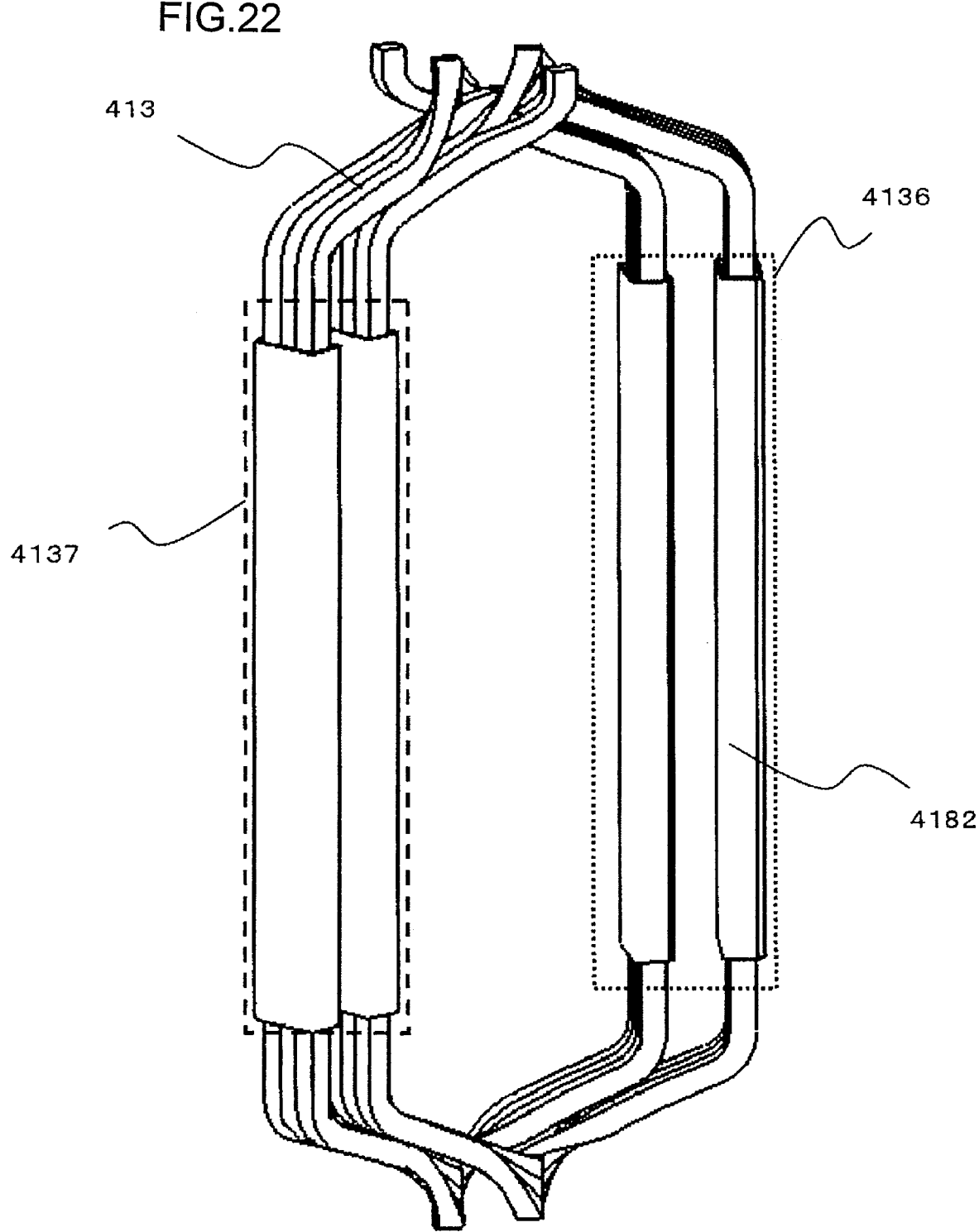
FIG. 22 is a perspective of the stator coil having slot insulators installed therein and having undergone the main forming process in the third embodiment.

FIG. 21 is a perspective of slot insulators 4182 mounted at the stator coil 413 shown in FIG. 20. FIG. 22 shows the stator coil 413 rendered into a state in which it is ready to be inserted at the stator core 412 by executing the main forming process on the stator coil 413 shown in FIG. 21.

It is to be noted that the same terms and reference numerals are assigned to components and portions identical to those in the first embodiment.

FIG. 19 shows a stator 4 constituted with a stator core 412 with 48 slots 411 formed therein along the circumferential direction with equal intervals and a stator coil 413 wound through the slots 411.

At the stator 4, the stator coil 413 is wound around through the slots 411 at the stator core 412 as shown in FIG. 19. At the stator 4 shown in FIG. 19, the stator coil 413 is wound with the slot insulators 4182 mounted so as to assure sufficient insulation distances between the stator coil 413 and the stator core 412 and between a slot bottom-side insertion portion 4136 of a coil segment wound through a given slot and a slot opening-side insertion portion 4137 of another coil segment wound through the same slot.

In reference to FIGS. 20 through 22, the insulation structure achieved at the stator 4 is described.

FIG. 20 is a perspective of a stator coil 413 formed through a preliminary forming process and FIG. 21 is a perspective of the stator coil 413 having undergone the preliminary forming process shown in FIG. 20, with slot insulators 4182 mounted at its slot bottom-side insertion portion 4136 and slot opening-side insertion portion 4137. FIG. 22 shows the stator coil having undergone the main forming process executed by fixing the slot bottom-side insertion portion 4136 and the slot opening-side insertion portion 4137 with a jig over the slot insulators 4182 and displacing the slot opening side along the counterclockwise direction relative to the rotational axis.

As shown in FIG. 21, the slot insulators 4182 are mounted at the slot bottom-side insertion portion 4136 and the slot opening-side insertion portion 4137 of the stator coil 413 shown in FIG. 20 obtained through the preliminary forming process.

Then, as illustrated in FIG. 22, the main forming process is executed by fixing the slot bottom-side insertion portion 4136 and the slot opening-side insertion portion 4137 with a jig over the slot insulators 4182 and displacing the slot opening side along the counterclockwise direction relative to the rotational axis.

By assuming this structure, damages during insertion into the stator 4 is prevented and a sufficient insulation distance between the stator coil 413 and the stator core 412 is assured.

In addition, since the slot bottom-side insertion portion 4136 and the slot opening-side insertion portion 4137 of the coil segments wound through the same slot are also insulated from each other, a higher level of reliability is assured even when a high voltage is applied in various phases.

This structure eliminates the need to fold back the opening portions of the slot insulators 4182 after inserting the stator coil 413, making it possible to improve the productivity while assuring a high level of reliability.

Fourth Embodiment

Figure 23:
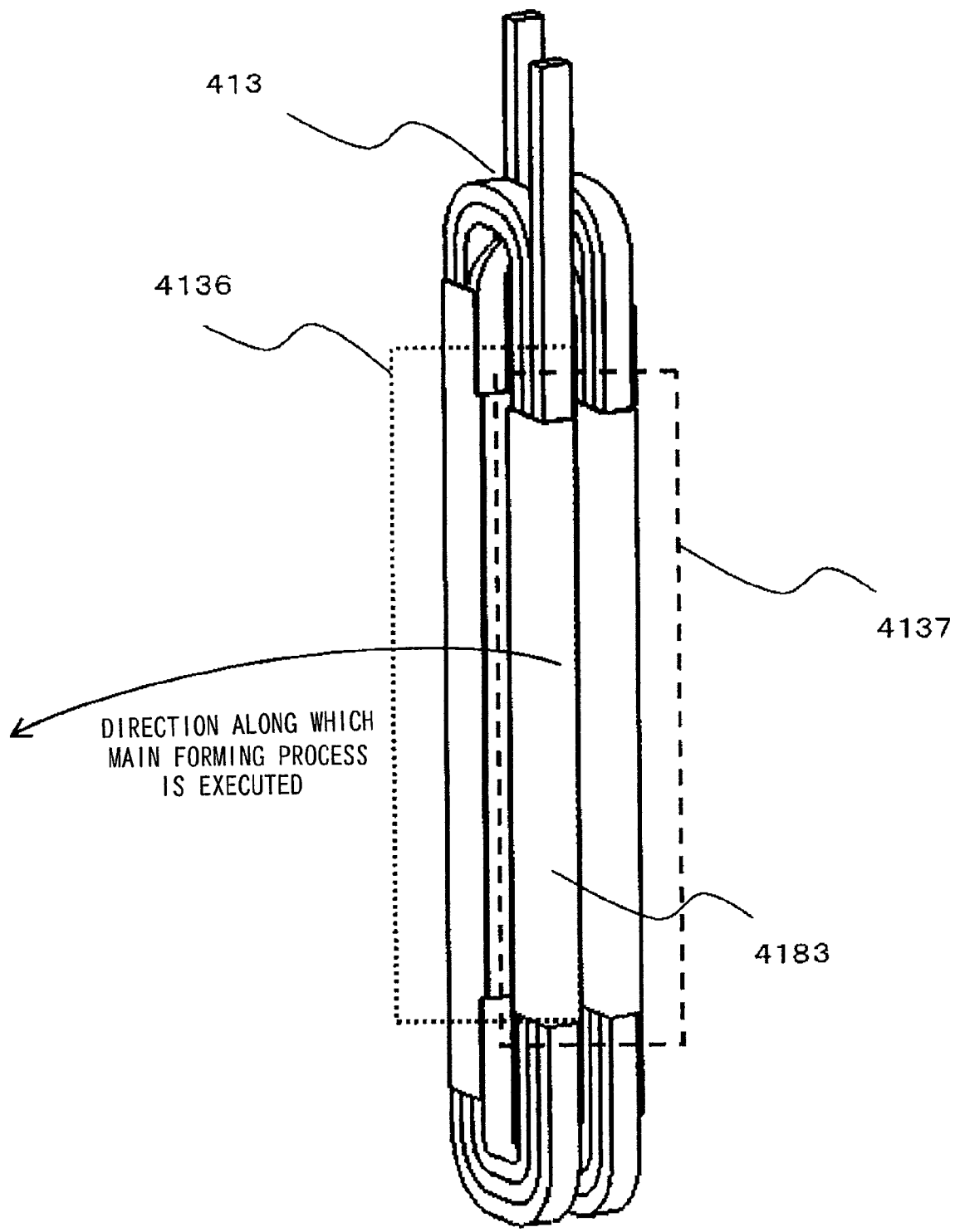
FIG. 23 is a perspective of the stator coil with slot insulators installed therein in a fourth embodiment.
Figure 24:
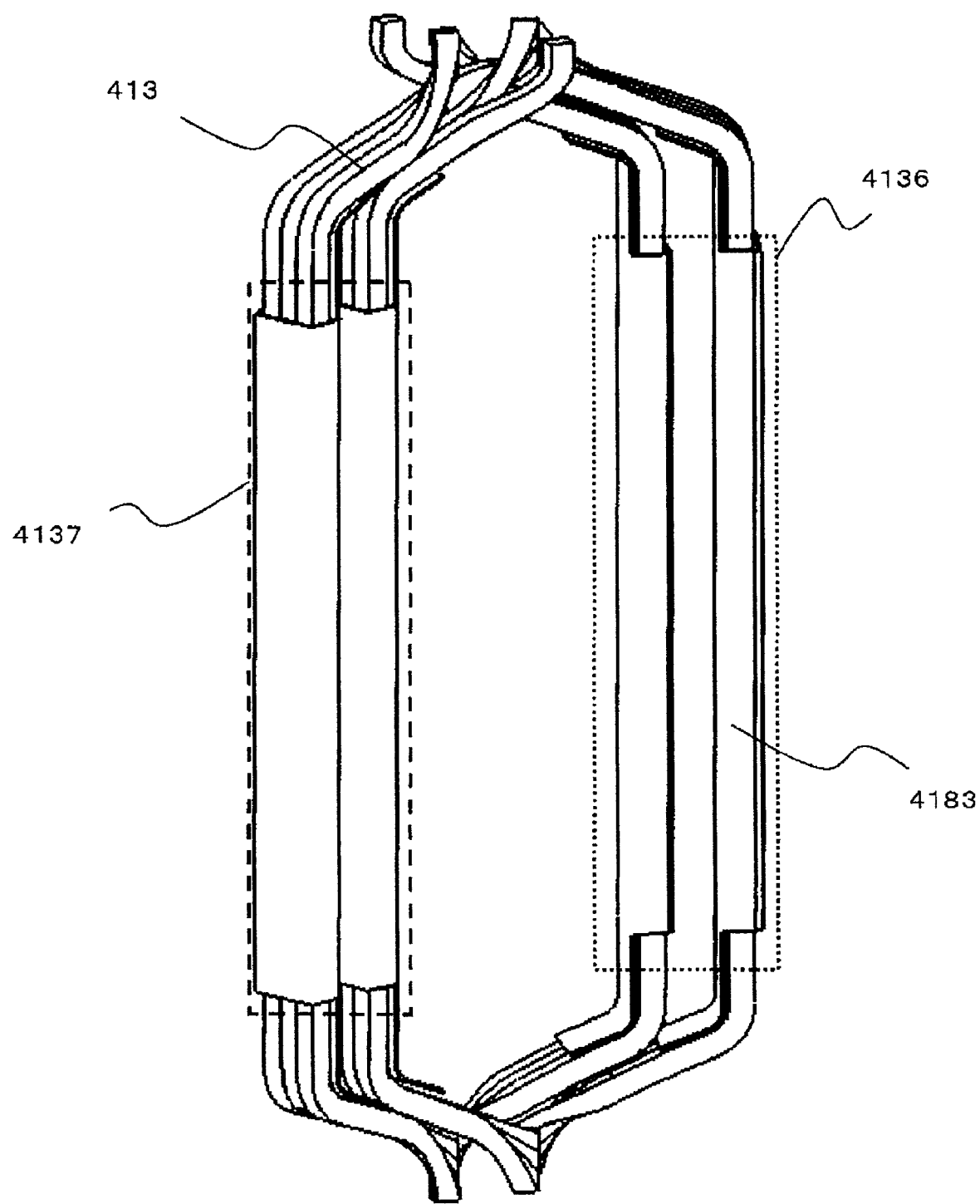
FIG. 24 is a perspective of the stator coil having slot insulators installed therein and having undergone the main forming process in the fourth embodiment.

Next, in reference to FIGS. 20, 23 and 24, the structure adopted in the stator 4 according to the fourth embodiment to assure desired insulation is explained.

FIG. 20 is a perspective of the stator coil 413 obtained through the preliminary forming process as has been explained in reference to the third embodiment. FIG. 23 is a perspective of the stator coil 413 having undergone the preliminary forming process shown in FIG. 20, with slot insulators 4183 mounted at its slot bottom-side insertion portion 4136 and slot opening-side insertion portion 4137. FIG. 24 shows the stator coil 413 rendered into a state in which it is ready to be inserted at the stator core 412 by executing the main forming process on the stator coil 413 shown in FIG. 23.

As shown in FIG. 23, the slot insulators 4183 are mounted at the slot bottom-side insertion portion 4136 and the slot opening-side insertion portion 4137 of the stator coil 413 shown in FIG. 20 obtained through the preliminary forming process.

The slot insulators 4183 are formed so that their measurement taken along the rotational axis at the side of the stator coil 413 obtained through the preliminary forming process, which is set on the coil inner side after the main forming process, is greater than the measurement at which a sufficient insulation distance between the stator core 412 and the stator coil 413 is assured.

Once the slot insulators 4183 are mounted at the slot bottom-side insertion portion 4136 and the slot opening-side insertion portion 4137 of the stator coil 413 having undergone the preliminary forming process, the main forming process is executed as shown in FIG. 24 by fixing the slot bottom-side insertion portion 4136 and the slot opening-side insertion portion 4137 with a jig over the slot insulators 4183 and displacing the slot opening side along the counterclockwise direction relative to the rotational axis.

By mounting the slot insulators 4183 at the stator coil 413 prior to the main forming process as described above, damages during insertion into the stator 4 is prevented and a sufficient insulation distance between the stator coil 413 and the stator core 412 is assured.

In addition, since the slot bottom-side insertion portion 4136 and the slot opening-side insertion portion 4137 of the coil segments wound through the same slot are also insulated, a higher level of reliability is assured even when a high voltage is applied in various phases.

Moreover, since the slot insulators 4183 are formed by ensuring that at least the area to be set on the coil inner side during the main forming process assumes a significant measurement, damage to the coil end that might otherwise occur during the forming process is prevented while achieving desirable insulation within each phase and between various phases.

This structure eliminates the need to fold back the opening portions of the slot insulators 4183 after inserting the stator coil 413, making it possible to improve the productivity while assuring a high level of reliability.

The rotating electrical machine manufacturing method according to the first and second embodiments described above is summarized below. The rotating electrical machine manufacturing method according to the first and second embodiments is a method for manufacturing the rotating electrical machine in which, with the stator 4 including the stator core 412 with a plurality of slots 411 each having an insertion portion on an inner circumferential side formed therein along a circumferential direction, and the stator coil 413 wound through the slots 411, the rotor 5 with a plurality of magnetic poles formed along the circumferential direction rotates relative to the stator 4. The rotating electrical machine manufacturing method includes the following steps:

(a) a preliminary forming step in which a preliminary forming process is executed by winding a plurality of times a continuous stator coil in a spiral pattern that includes a pair of linear portions facing opposite each other;

(b) a disposing step in which a plurality of winding portions are disposed along the circumferential direction so that the linear portions at the stator coil having undergone the preliminary forming process in the preliminary forming step are positioned on an inner circumferential side and an outer circumferential side;

(c) a temporary forming step in which the linear portions set on the inner circumferential side and the outer circumferential side at the plurality of winding portions at the stator coil, disposed along the circumferential direction in the disposing step, are rotated relative to each other;

(d) an insulation step in which a slot insulator constituted with an insulator sheet is inserted at each of the plurality of slots so as to form an opening on the inner circumferential side;

(e) an insertion step in which the stator coil is inserted into each of the plurality of slots through the opening formed at the insulator, so that the linear portion set on the outer circumferential side at the stator coil having undergone the temporary forming process in the temporary forming step, is positioned on a bottom side of the plurality of slots and that the linear portion, set on the inner circumferential side is positioned toward the stator coil insertion portion;

(f) a holding step in which a holding member constituted of a nonmagnetic material is inserted along an axial direction into each of the slots so as to hold therein the slot insulator;

(g) a connecting step in which terminal portions of the stator coil having been inserted in the plurality of slots through the insertion step are electrically connected; and (h) a mounting step in which the rotor is mounted inside the stator via a bearing so that the rotor is allowed to rotate relative to the stator.

The rotating electrical machine manufacturing method according to the third and fourth embodiments described above is summarized below. The rotating electrical machine manufacturing method according to the third and fourth embodiments is a method for manufacturing the rotating electrical machine in which, with the stator 4 including the stator core 412 with a plurality of slots 411 each having an insertion portion on an inner circumferential side formed therein along a circumferential direction, and the stator coil 413 wound through the slots 411, the rotor 5 with a plurality of magnetic poles formed along the circumferential direction rotates relative to the stator 4. The rotating electrical machine manufacturing method includes the following steps:

(A) a preliminary forming step in which a preliminary forming process is executed by winding a plurality of times a continuous stator coil in a spiral pattern that includes a pair of linear portions facing opposite each other;

(B) an insulation step in which insulators are mounted at the pair of linear portions at the stator coil having undergone the preliminary forming process in the preliminary forming step;

(C) a disposing step in which a plurality of winding portions are disposed along the circumferential direction so that the linear portions at the stator coil, with the insulators mounted thereat through the insulation step, are positioned on an inner circumferential side and an outer circumferential side;

(D) a temporary forming step in which the linear portions set on the inner circumferential side and the outer circumferential side at the plurality of winding portions at the stator coil, disposed along the circumferential direction in the disposing step, are rotated relative to each other;

(E) an insertion step in which the stator coil is inserted into each of the plurality of slots, so that the linear portion, set on the outer circumferential side at the stator coil having undergone the temporary forming process in the temporary forming step, is positioned on a bottom side of the plurality of slots and that the linear portion, set on the inner circumferential side, is positioned toward the stator coil insertion portion; and (F) a mounting step in which the rotor is mounted inside the stator via a bearing so that the rotor is allowed to rotate relative to the stator.

While any of the rotating electrical machines achieved in the first to fourth embodiments of the present invention described above can be provided as a relatively compact unit optimal in application as a vehicle drive motor, it still provides a relatively high output and assures better productivity.

In addition, the stator coil 413 used in any of the first to fourth embodiments of the present invention can be constituted with conductors with a round section or conductors with a substantially rectangular section. In the latter case, the space factor inside the slots can be improved, which, in turn, makes it possible to improve the rotating electrical machine efficiency.

If conductors with a substantially rectangular section are used in a rotating electrical machine in the related art, a substantial number of areas need to be insulated after inserting the conductors in the slots at the stator, which is bound to compromise the productivity. In contrast, by adopting any of the first to fourth embodiments of the present invention, labor of the insulation process executed after inserting the conductors in the slots can be greatly reduced or the insulation process can be omitted altogether, thereby improving the productivity while assuring a high level of reliability.

In the first to fourth embodiments of the present invention, the area of the continuously wound coil where the coil segments, constituted with a continuous wire, are lap-wound and the lap-wound coil segments are each disposed on the inner side along the radial direction at one slot and is disposed on the outer side in the radial direction at the other slot so as to shift from the inner side to the outer side or the outer side to the inner side of the slots at the coil end.

In the first to fourth embodiments of the present invention assuming such a positional arrangement, the continuously wound coil is disposed with a streamlined positional arrangement, which allows the number of coil turns to be increased while minimizing the number of electrical connection points in spite of the increase in the number of coil turns.

In addition, by adopting any of the first to fourth embodiments of the present invention, the rotating electrical machine can still be provided as a relatively compact unit in spite of the increase in the number of turns.

In the first embodiment of the present invention, a plurality of conductors are disposed in each slot along the radial direction perpendicular to the rotational axis with a single conductor set in each slot along the circumferential direction. In slots adjacent to each other along the circumferential direction, conductors assuming the same phase and connected so as to conduct electric currents flowing along the same direction are disposed.

Through the first to fourth embodiments of the present invention assuming such a positional arrangement at the stator coil 413, a rotating electrical machine assuring better productivity is provided.

Furthermore, in the first to fourth embodiments of the present invention, the windings assuming the same phase and disposed in slots set next to each other are connected in series and the individual wire connections at the stator coil 413 are made in units of individual same-phase serial windings each constituted with the two serially connected windings so as to achieve better electrical balance at the stator coil 413.

The stator coil 413 achieved in the first to fourth embodiments of the present invention may be used in a permanent magnet rotating machine or an induction-type rotating electrical machine.

An explanation is given above in reference to the first to fourth embodiments of the present invention on an example in which the present invention is adopted in an induction rotating electrical machine with an eight-pole configuration. By assuming six or more poles at the induction-type rotating electrical machine, and better still by assuming an eight-pole or ten-pole configuration at the induction rotating electrical machine, the thickness of the magnetic path measured along the radial direction at the core back of the stator core can be reduced.

In addition, by forming six or more poles at the rotor 5 and better still by forming eight or ten poles at the rotor 5 in the first to fourth embodiments of the present invention, the thickness of the magnetic path measured along the radial direction at the rotor yoke 530 can be reduced.

When a greater number of poles are formed in conjunction with the squirrel-cage conductors included at the rotor 5, the efficiency will be compromised. For this reason, it is desirable to form six to ten poles at a rotating electrical machine to be used in a vehicle drive system. It is even better to form eight to ten poles in such a rotating electrical machine, and ultimately, the optimal number of poles to be formed at the rotating electrical machine is eight.

As described above, a rotating electrical machine assuring outstanding productivity can be obtained by adopting any of the first to fourth embodiments of the present invention.

In addition, the rotating electrical machine manufacturing method achieved in the first to fourth embodiments of the present invention improves the productivity while assuring a high level of reliability.

The above described embodiments are examples and various modifications can be made without departing from the scope of the invention.

What is claimed is:

1. A rotating electrical machine, comprising:
a stator that comprises a stator core and a stator coil; and a rotor disposed rotatably on an inner circumferential side of the stator core, wherein:

the stator core comprises a plurality of slots opening on the inner circumferential side and the slots are each formed as an open slot with a width of an inner circumferential-side opening thereof ranging along a circumferential direction set substantially equal to or greater than a width of a bottom side measured along the circumferential direction;

the stator is formed by mounting an insulator constituted with an insulator sheet at the stator coil as an integrated part thereof and winding the stator coil through the plurality of slots;

the stator coil includes a pair of coil segments of a single phase which are constituted with a single continuous conductor, wherein one of the pair of coil segments is inserted in and wound through a first slot and a second slot which is separated from the first slot by more than one slot among the plurality of slots, and wherein another of the pair of coil segments is inserted in and wound through a third slot which is adjacent to the first slot and a fourth slot which is adjacent to the second slot;

a number of slots present between the first slot and the second slot is the same as a number of slots present between the third slot and the fourth slot; and the number of slots present between the first slot and the second slot is one or more and the number of slots present between the third slot and the fourth slot is one or more.

2. A rotating electrical machine according to claim 1, wherein:

the stator coil is constituted with a continuous wire wound so as to range across through the plurality of slots at least at one end of the stator core along an axial direction; and a side of the insulator bent as the wire is laid across the plurality of slots, assumes a greater length than a length of the slots measured along the axial direction.

3. A rotating electrical machine according to claim 2, wherein:

a length of the insulator is greater than the length of the slots measured along the axial direction.

4. A rotating electrical machine according to claim 1, wherein:

the insulator is constituted with a resin material molded as an integrated part of the stator coil.

5. A rotating electrical machine according to claim 1, wherein:

the insulator sheet is bonded to the stator coil.

6. A rotating electrical machine according to claim 1, wherein:

the stator coil is wound through lap winding, at least a winding portion where the stator coil is lap-wound is constituted with a continuous wire and the stator coil is wound so as to range across the inner circumferential side and an outer circumferential side of the slots on two sides of the stator core along an axial direction.

7. A rotating electrical machine according to claim 6, wherein:

the stator coil has a substantially rectangular section.

8. A rotating electrical machine according to claim 1, wherein:

the pair of coil segments is connected with another pair of coil segments of said single phase at their apexes in a coil end through a crossover wire.

9. A rotating electrical machine according to claim 8, wherein:

the crossover wire is disposed at one end of the stator in an axial direction of the stator.

* * * * *